United States Patent
Fields et al.

(10) Patent No.: US 12,016,061 B2
(45) Date of Patent: Jun. 18, 2024

(54) REMOTE MOBILE DEVICE MANAGEMENT

(71) Applicant: Platform Science, Inc., San Diego, CA (US)

(72) Inventors: Jacob Fields, Ocean Ridge, FL (US); Don Son, San Diego, CA (US); Scott Kopchinsky, San Diego, CA (US); John C. Kennedy, San Diego, CA (US); Darrin Demchuk, San Diego, CA (US); Lin Zou, San Diego, CA (US)

(73) Assignee: Platform Science, Inc., San Diego, CA (US)

( * ) Notice: Subject to any disclaimer, the term of this patent is extended or adjusted under 35 U.S.C. 154(b) by 498 days.

(21) Appl. No.: 17/486,777

(22) Filed: Sep. 27, 2021

(65) Prior Publication Data

US 2022/0086924 A1    Mar. 17, 2022

Related U.S. Application Data

(63) Continuation-in-part of application No. 16/927,231, filed on Jul. 13, 2020, now Pat. No. 11,197,330.
(Continued)

(51) Int. Cl.
*H04W 76/10* (2018.01)
*H04L 67/12* (2022.01)
(Continued)

(52) U.S. Cl.
CPC ............ *H04W 76/10* (2018.02); *H04L 67/12* (2013.01); *H04W 4/40* (2018.02); *H04W 76/19* (2018.02); *H04W 84/005* (2013.01); *H04W 84/12* (2013.01)

(58) Field of Classification Search
CPC ....... H04W 76/10; H04W 4/40; H04W 76/19; H04W 84/005; H04W 84/12; H04W 4/38;
(Continued)

(56) References Cited

U.S. PATENT DOCUMENTS

| 5,579,233 A | 11/1996 | Burns |
| 5,954,773 A | 9/1999 | Luper |

(Continued)

FOREIGN PATENT DOCUMENTS

| CN | 110176153 | 8/2019 |
| GB | 2449476 | 11/2008 |

(Continued)

OTHER PUBLICATIONS

Siegel et al., A Survey of the connected vehicle landscape—Architectures, enabling technologies, applications and development areas, IEEE Transactions on Intelligent Transportation Systems 19.8 (2017): 2391-2406, Oct. 4, 2017.
(Continued)

*Primary Examiner* — Kyaw Z Soe
(74) *Attorney, Agent, or Firm* — Clause Eight; Michael Catania

(57) ABSTRACT

A system (1100) and method for controlling a function of a mobile device (1107) over a secure wireless network is disclosed herein. The system (1100) comprises a mobile device (1107) for a vehicle (1000), a connected vehicle device (135) comprising on-vehicle data for the vehicle (1000), and an off vehicle source selected from a database, a cloud source, or a physical structure. The system (1100) is configured to access and combine off-vehicle content with on-vehicle data in order to enable, disable or manage at least one function of the mobile device (1107) over the secure wireless network.

21 Claims, 17 Drawing Sheets

Related U.S. Application Data which is a continuation-in-part of application No. 16/870,955, filed on May 9, 2020, now Pat. No. 11,330,644, and a continuation-in-part of application No. 16/664,906, filed on Oct. 27, 2019, now Pat. No. 10,803,682, said application No. 16/870,955 is a continuation-in-part of application No. 16/416,396, filed on May 20, 2019, now Pat. No. 10,652,935, which is a continuation-in-part of application No. 16/118,436, filed on Aug. 31, 2018, now Pat. No. 10,334,638, which is a continuation of application No. 15/917,633, filed on Mar. 11, 2018, now Pat. No. 10,070,471, said application No. 16/664,906 is a continuation of application No. 15/859,380, filed on Dec. 30, 2017, now Pat. No. 10,475,258, said application No. 15/917,633 is a continuation of application No. 15/624,814, filed on Jun. 16, 2017, now Pat. No. 9,961,710, said application No. 15/859,380 is a continuation-in-part of application No. 15/624,814, filed on Jun. 16, 2017, now Pat. No. 9,961,710.

(60) Provisional application No. 63/087,082, filed on Oct. 2, 2020, provisional application No. 62/873,922, filed on Jul. 14, 2019, provisional application No. 62/441,298, filed on Dec. 31, 2016, provisional application No. 62/441,290, filed on Dec. 31, 2016, provisional application No. 62/441,315, filed on Dec. 31, 2016, provisional application No. 62/352,014, filed on Jun. 19, 2016.

(51) Int. Cl.
*H04W 4/40* (2018.01)
*H04W 76/19* (2018.01)
*H04W 84/00* (2009.01)
*H04W 84/12* (2009.01)

(58) Field of Classification Search
CPC .......... H04W 4/44; H04W 4/46; H04L 67/12; H04L 67/10; H04L 67/52; H04L 67/125; H04L 67/306; H04L 63/083
See application file for complete search history.

(56) References Cited

U.S. PATENT DOCUMENTS

| | | |
|---|---|---|
| 5,995,898 A | 11/1999 | Tuttle |
| 6,292,724 B1 | 9/2001 | Apsell et al. |
| 6,526,341 B1 | 2/2003 | Bird et al. |
| 6,611,686 B1 | 8/2003 | Smith et al. |
| 6,651,001 B2 | 11/2003 | Apsell |
| 6,735,150 B2 | 5/2004 | Rothman |
| 6,925,308 B2 | 8/2005 | Goldsmith et al. |
| 7,043,365 B2 | 5/2006 | Inbar et al. |
| 7,079,230 B1 | 7/2006 | McInerney et al. |
| 7,092,803 B2 | 8/2006 | Kapolka et al. |
| 7,327,250 B2 | 2/2008 | Harvey |
| 7,350,707 B2 | 4/2008 | Barkan |
| 7,555,378 B2 | 6/2009 | Larschan et al. |
| 7,616,105 B2 | 11/2009 | Macielinski et al. |
| 7,725,216 B2 | 5/2010 | Kim |
| 8,626,144 B2 | 1/2014 | Talty et al. |
| 8,626,568 B2 | 1/2014 | Warkentin et al. |
| 8,789,161 B2 | 7/2014 | Jeal |
| 8,855,626 B2 | 10/2014 | O'Toole et al. |
| 9,032,493 B2 | 5/2015 | Lortz et al. |
| 9,064,422 B2 | 6/2015 | Mohn et al. |
| 9,147,335 B2 | 9/2015 | Raghunathan et al. |
| 9,215,590 B2 | 12/2015 | Bondesen et al. |
| 9,256,992 B2 | 2/2016 | Davidson |
| 9,262,934 B2 | 2/2016 | Mohn et al. |
| 9,275,010 B2 | 3/2016 | Kote et al. |
| 9,376,090 B2 | 6/2016 | Gennermann |
| 9,390,628 B2 | 7/2016 | Mohn et al. |
| 9,424,751 B2 | 8/2016 | Hodges et al. |
| 9,445,447 B2 | 9/2016 | Pal et al. |
| 9,544,768 B2 | 1/2017 | Steffey et al. |
| 9,578,668 B2 | 2/2017 | Sim |
| 9,632,506 B2 | 4/2017 | Wellman et al. |
| 9,595,018 B2 | 6/2017 | Tang |
| 9,671,241 B2 | 6/2017 | Tang |
| 9,754,425 B1 | 9/2017 | Iqbal et al. |
| 9,961,710 B2 | 5/2018 | Son et al. |
| 10,070,471 B2 | 9/2018 | Son et al. |
| 10,074,220 B2 | 9/2018 | Cawse et al. |
| 10,255,575 B2 | 4/2019 | Warkentin et al. |
| 10,255,606 B2 | 4/2019 | Harter et al. |
| 10,334,638 B2 | 6/2019 | Son et al. |
| 10,475,258 B1 | 11/2019 | Son et al. |
| 10,652,935 B1 | 5/2020 | Son et al. |
| 10,803,682 B1 | 10/2020 | Son et al. |
| 10,829,063 B1 | 11/2020 | Konrardy et al. |
| 10,917,921 B2 | 2/2021 | Kennedy et al. |
| 10,930,091 B1 | 2/2021 | Son et al. |
| 11,197,329 B2 | 12/2021 | Kennedy et al. |
| 11,197,330 B2 | 12/2021 | Kennedy et al. |
| 11,330,644 B2 | 5/2022 | Kopchinsky et al. |
| 11,419,163 B2 | 8/2022 | Kennedy et al. |
| 11,430,270 B1 | 8/2022 | Son et al. |
| 11,438,938 B1 | 9/2022 | Kennedy et al. |
| 11,503,655 B2 | 11/2022 | Kennedy et al. |
| 11,528,759 B1 | 12/2022 | Kennedy et al. |
| 2008/0137860 A1 | 6/2008 | Silvernail |
| 2009/0099724 A1 | 4/2009 | Kranz et al. |
| 2009/0276115 A1 | 11/2009 | Chen |
| 2010/0279733 A1 | 11/2010 | Karsten et al. |
| 2011/0080256 A1 | 4/2011 | Mehalschick, Sr. |
| 2012/0161927 A1 | 6/2012 | Pierfelice et al. |
| 2012/0254960 A1 | 10/2012 | Lortz et al. |
| 2012/0262283 A1 | 10/2012 | Biondo et al. |
| 2013/0017816 A1 | 1/2013 | Talty et al. |
| 2013/0046846 A1 | 2/2013 | Mason et al. |
| 2013/0110296 A1 | 5/2013 | Khoo et al. |
| 2013/0304276 A1 | 11/2013 | Flies |
| 2014/0122187 A1 | 5/2014 | Warkentin et al. |
| 2014/0162598 A1 | 6/2014 | Villa-Real |
| 2014/0213176 A1 | 7/2014 | Mendelson |
| 2014/0223235 A1 | 8/2014 | Gundlapalli et al. |
| 2014/0232569 A1 | 8/2014 | Skinder et al. |
| 2014/0309891 A1 | 10/2014 | Ricci |
| 2014/0309892 A1 | 10/2014 | Ricci |
| 2015/0099500 A1 | 4/2015 | Chalmers |
| 2015/0120135 A1 | 4/2015 | Lawrenson |
| 2015/0147974 A1 | 5/2015 | Tucker et al. |
| 2015/0215986 A1 | 7/2015 | Lei et al. |
| 2015/0339334 A1 | 11/2015 | Hanke |
| 2015/0365979 A1 | 12/2015 | Park |
| 2016/0011001 A1 | 1/2016 | Emory et al. |
| 2016/0066127 A1 | 3/2016 | Choi et al. |
| 2016/0084657 A1 | 3/2016 | Schilling et al. |
| 2016/0150588 A1 | 5/2016 | Yae |
| 2016/0247153 A1 | 8/2016 | Leseky |
| 2016/0254968 A1* | 9/2016 | Ebtekar .................. H04L 41/12 709/223 |
| 2016/0277923 A1 | 9/2016 | Steffey et al. |
| 2016/0334236 A1 | 11/2016 | Mason et al. |
| 2016/0343255 A1 | 11/2016 | Warren |
| 2017/0011561 A1 | 1/2017 | Makke et al. |
| 2017/0017927 A1 | 1/2017 | Domnick et al. |
| 2017/0104728 A1 | 4/2017 | Girard et al. |
| 2017/0178035 A1 | 6/2017 | Grimm et al. |
| 2017/0302569 A1* | 10/2017 | Ramaswamy .......... H04L 67/10 |
| 2017/0367142 A1 | 12/2017 | Son et al. |
| 2018/0376522 A1 | 12/2018 | Son et al. |
| 2019/0066041 A1 | 2/2019 | Hance et al. |
| 2019/0156096 A1 | 5/2019 | Lin et al. |
| 2019/0179029 A1 | 6/2019 | Pacala et al. |
| 2019/0229987 A1* | 7/2019 | Shelke ................ H04L 41/0813 |
| 2019/0255963 A1 | 8/2019 | Goei |
| 2019/0256096 A1 | 8/2019 | Graf et al. |

(56) References Cited

U.S. PATENT DOCUMENTS

| | | | |
|---|---|---|---|
| 2020/0125870 A1 | 4/2020 | Nishimura et al. |
| 2020/0184808 A1 | 6/2020 | Ewert |
| 2020/0211376 A1 | 7/2020 | Roka |
| 2020/0280827 A1 | 9/2020 | Fechtal et al. |
| 2020/0281030 A1 | 9/2020 | Kopchinsky et al. |
| 2020/0287775 A1 | 9/2020 | Khasis |
| 2020/0294401 A1 | 9/2020 | Kerecsen |
| 2020/0329512 A1 | 10/2020 | Kennedy et al. |
| 2020/0344824 A1 | 10/2020 | Kennedy et al. |

FOREIGN PATENT DOCUMENTS

| | | |
|---|---|---|
| IN | 110176153 | 8/2019 |
| KR | 20130041660 | 4/2013 |
| KR | 20130041660 A | 4/2013 |
| WO | WO9637079 | 11/1996 |
| WO | WO2016/012064 | 1/2016 |
| WO | WO2021055384 | 3/2021 |
| WO | WO2022026344 | 2/2022 |
| WO | WO2022072287 | 4/2022 |
| WO | WO2022081494 | 4/2022 |
| WO | WO2022109298 | 5/2022 |

OTHER PUBLICATIONS

International Search Report and Written Opinion for PCT Application PCT/US2022/033096, mailed on Sep. 6, 2022.
International Search Report and Written Opinion for PCT Application PCT/US2021/043096, mailed on Nov. 3, 2021.
International Search Report for PCT Application PCT/US2021/052247, mailed on Jan. 13, 2022.
Written Opinion for PCT Application PCT/US2021/052247, mailed on Jan. 13, 2022.
Intl Search Report PCT/US2021/054449, mailed on Dec. 23, 2021.
Written Opinion PCT/US2021/054449, Nov. 19, 2021.
Written Opinion and Search Report PCT/US2021/060137, Feb. 11, 2021.
Written Opinion and Search Report PCT/US2022/024296, Jul. 22, 2022.
Written Opinion and Search Report PCT/US2022/020822, Jun. 11, 2022.
International Search Report for PCT Application PCT/US2017/037825, mailed on Sep. 21, 2017.
European Search Report for EP Application 17815967.9 dated Dec. 4, 2019.
Office Action for U.S. Appl. No. 15/624,814, dated Aug. 22, 2017.
International Search Report and Written Opinion for PCT Application PCT/US2020/032389, mailed on Jul. 2, 2020.
International Search Report and Written Opinion for PCT Application PCT/US2020/027032, mailed on May 28, 2020.
International Search Report and Written Opinion for PCT Application PCT/US2020/039639, mailed on Sep. 28, 2020.
International Search Report for PCT Application PCT/US2020/050940 mailed on Dec. 3, 2020.
International Search Report for PCT Application PCT/US2020/041788, mailed on Oct. 22, 2020.
International Search Report for PCT Application PCT/US2021/054449, mailed on Dec. 23, 2021.
International Search Report for PCT Application PCT/US2021/043096, mailed on Nov. 3, 2021.

\* cited by examiner

REMOTE MOBILE DEVICE MANAGEMENT

CROSS REFERENCES TO RELATED APPLICATIONS

The Present application claims priority to U.S. Patent Application No. 63/087,082, filed on Oct. 2, 2020, and the Present application is also a continuation-in-part application of U.S. patent application Ser. No. 16/927,231, filed on Jul. 13, 2020, which claims priority to U.S. Provisional Patent Application No. 62/873,922, filed on Jul. 14, 2019, and U.S. patent application Ser. No. 16/927,231 is a continuation-in-part application of U.S. patent application Ser. No. 16/870,955, filed on May 9, 2020, which is a continuation-in-part application of U.S. patent application Ser. No. 16/416,396, filed on May 20, 2019, now U.S. patent Ser. No. 10/652,935, issued on May 12, 2020, which is a continuation-in-part application of U.S. patent application Ser. No. 16/118,436, filed on Aug. 31, 2018, now U.S. patent Ser. No. 10/334,638, issued on Jun. 25, 2019, which is a continuation application of U.S. patent application Ser. No. 15/917,633, filed on Mar. 11, 2018, now U.S. patent Ser. No. 10/070,471, issued on Sep. 4, 2018, which is a continuation application of U.S. patent application Ser. No. 15/624,814, filed on Jun. 16, 2017, now U.S. Pat. No. 9,961,710, issued on May 1, 2018, which claims priority to U.S. Provisional Patent Application No. 62/352,014, filed on Jun. 19, 2016, and U.S. patent application Ser. No. 16/927,231 is a continuation-in-part application of U.S. patent application Ser. No. 16/664,906, filed on Oct. 27, 2019, now U.S. patent Ser. No. 10/803,682, issued on Oct. 13, 2020, which is a continuation application of U.S. patent application Ser. No. 15/859,380, filed on Dec. 30, 2017, now U.S. patent Ser. No. 10/475,258, issued on Nov. 12, 2019, which is a continuation-in-part application of U.S. patent application Ser. No. 15/624,814, filed Jun. 16, 2017, now U.S. Pat. No. 9,961,710, issued on May 1, 2018, which claims priority to U.S. Provisional Patent Application No. 62/352,014, filed on Jun. 19, 2016, and U.S. patent application Ser. No. 15/859,380 claims priority to U.S. Provisional Patent Application No. 62/441,290, filed on Dec. 31, 2016, U.S. Provisional Patent Application No. 62/441,298, filed on Dec. 31, 2016, and U.S. Provisional Patent Application No. 62/441,315, filed on Dec. 31, 2016, each of which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention generally relates to remote mobile device management for a vehicle.

Description of the Related Art

The prior art discusses various techniques for wireless networks for vehicles.

U.S. Pat. No. 9,215,590 for Authentication Using Vehicle Data Pairing discloses the wireless pairing of a portable device with an on-board computer of a vehicle for authenticating a transaction with a third party.

General definitions for terms utilized in the pertinent art are set forth below.

Beacon is a management frame that contains all of the information about a network. In a WLAN, Beacon frames are periodically transmitted to announce the presence of the network.

BLUETOOTH technology is a standard short range radio link that operates in the unlicensed 2.4 gigaHertz band.

FTP or File Transfer Protocol is a protocol for moving files over the Internet from one computer to another.

Hypertext Transfer Protocol ("HTTP") is a set of conventions for controlling the transfer of information via the Internet from a web server computer to a client computer, and also from a client computer to a web server, and Hypertext Transfer Protocol Secure ("HTTPS") is a communications protocol for secure communication via a network from a web server computer to a client computer, and also from a client computer to a web server by at a minimum verifying the authenticity of a web site.

Internet is the worldwide, decentralized totality of server computers and data-transmission paths which can supply information to a connected and browser-equipped client computer, and can receive and forward information entered from the client computer.

Media Access Control (MAC) Address is a unique identifier assigned to the network interface by the manufacturer.

Memory generally includes any type of integrated circuit or storage device configured for storing digital data including without limitation ROM, PROM, EEPROM, DRAM, SDRAM, SRAM, flash memory, and the like.

Organizationally Unique Identifier (OUI) is a 24-bit number that uniquely identifies a vendor, manufacturer, or organization on a worldwide basis. The OUI is used to help distinguish both physical devices and software, such as a network protocol, that belong to one entity from those that belong to another.

Processor generally includes all types of processors including without limitation microprocessors, general purpose processors, gate arrays, array processors, application specific integrated circuits (ASICs) and digital signal processors.

SCP (Secure Connection Packet) is used to provide authentication between multiple devices or a local party and remote host to allow for secure communication or the transfer of computer files.

SSID (Service Set Identifier) is a 1 to 32 byte string that uniquely names a wireless local area network.

Transfer Control Protocol/Internet Protocol ("TCP/IP") is a protocol for moving files over the Internet.

URL or Uniform Resource Locator is an address on the World Wide Web.

User Interface or UI is the junction between a user and a computer program. An interface is a set of commands or menus through which a user communicates with a program. A command driven interface is one in which the user enter commands. A menu-driven interface is one in which the user selects command choices from various menus displayed on the screen.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access.

There are multiple sources of data that can be utilized by a vehicle for efficiency and cost savings. However, there is a need for collecting, processing and interpreting the data in a manner that can be utilized by a vehicle.

BRIEF SUMMARY OF THE INVENTION

The present invention provides a system and method where an assigning authority is configured to enable, disable, or manage at least one function of a mobile device through a secure wireless network.

One aspect of the present invention is a system for controlling a function of a mobile device over a secure wireless network. The system comprises a mobile device for a vehicle, a connected vehicle device (CVD) comprising on-vehicle data for a vehicle, and at least one off vehicle source selected from a group comprising at least one database, at least one cloud source, or at least one physical structure with a communication device. The mobile device is configured to access and combine off-vehicle content with on-vehicle data in order to enable, disable or manage at least one function of the mobile device over a secure wireless network.

Another aspect of the present invention is a system for controlling a function of a mobile device over a secure wireless network from an assigning authority. The system comprises a mobile device for a vehicle, a connected vehicle device (CVD) comprising on-vehicle data for a vehicle, an assigning authority engine, and at least one off vehicle source selected from a group comprising at least one database, at least one cloud source, or at least one physical structure with a communication device. The assigning authority is configured to access and combine off-vehicle content with on-vehicle data in order to enable, disable or manage at least one function of the mobile device over a secure wireless network.

Yet another aspect of the present invention a non-transitory computer-readable medium that stores a program that causes a processor to perform functions for utilizing a remote profile manager for a vehicle. The functions includes access and combine a plurality of contents of each of a plurality of databases by an assigning authority to produce a plurality of dynamic, temporal combinations of data elements and a plurality of instructions for a vehicle; execute the plurality of dynamic, temporal combinations; access data from the plurality of cloud sources comprising third party data and vehicle, timing, event, and/or positioning ("VTEP") data to inform a plurality of instruction sets delivered by the assigning authority; use one or more elements of the VTEP data as the basis to synchronize timing between the data, or computational outputs of two or more sources of electronic information; form a single coherent information picture from fusing data and computational information from on-vehicle and off-vehicle sources.

Yet another aspect of the present invention is a method for remote profile management for utilizing data and computational information from on-vehicle and off-vehicle sources. The method includes accessing a plurality of contents of each of a plurality of databases by an assigning authority. The method also includes combining the plurality of contents to produce a plurality of dynamic, temporal combinations of data elements and a plurality of instruction sets for a vehicle. The method also includes executing the plurality of dynamic, temporal combinations. The method also includes accessing data from a plurality of cloud sources comprising third party data and vehicle, timing, event, and/or positioning ("VTEP") data to inform the plurality of instruction sets delivered by the assigning authority. The method also includes using one or more elements of the VTEP data as a basis to synchronize timing between the data, or computational outputs of two or more sources of electronic information. The method also includes forming a single coherent information picture from fusing data and computational information from the on-vehicle and the off-vehicle sources.

Yet another aspect of the present invention is a system for utilizing data and computational information from on-vehicle and off-vehicle sources. The system comprises an assigning authority engine, a remote profile manager toolset, at least one on-vehicle source comprising on-vehicle data for a vehicle, and at least one off-vehicle source comprising at least one off-vehicle content. The at least one off-vehicle source is selected from a group comprising at least one database, at least one cloud source or at least one physical structure with a communication device. The assigning authority is configured to access and combine the at least one off-vehicle content and the on-vehicle data to produce a plurality of dynamic, temporal combinations of data elements and a plurality of instructions. The remote profile manager toolset is configured to execute the plurality of dynamic, temporal combinations to access vehicle, timing, event, and/or positioning ("VTEP") data to inform the plurality of instruction sets communicated by the assigning authority engine. The remote profile manager toolset is configured to use one or more elements of the VTEP data to synchronize timing between the on-vehicle data or a computational output of the off-vehicle content, to generate an information data set for the vehicle.

Yet another aspect of the present invention is a system for utilizing data and computational information from on-vehicle and off-vehicle sources. The system comprises an assigning authority engine, a remote profile manager toolset, a plurality of off-vehicle sources and a plurality of on-vehicle sources. The plurality of off-vehicle sources comprises a plurality of databases, at least one cloud source and at least one physical structure with a communication device, wherein each of the plurality of off-vehicle sources comprises off-vehicle content. The plurality of on-vehicle sources comprising a vehicle CVD, a plurality of sensors and an on-vehicle connected mobility device, each of the plurality of on-vehicle sources comprising on-vehicle data for a vehicle. The assigning authority is configured to access and combine the off-vehicle content and the on-vehicle data to produce a plurality of dynamic, temporal combinations of data elements and a plurality of instructions. The remote profile manager toolset is configured to execute the plurality of dynamic, temporal combinations to access vehicle, timing, event, and/or positioning ("VTEP") data to inform the plurality of instruction sets communicated by the assigning authority engine. The remote profile manager toolset is configured to use one or more elements of the VTEP data to synchronize timing between the on-vehicle data or a computational output of the off-vehicle content, to generate an information data set for the vehicle.

Yet another aspect of the present invention is a system for controlling a function of a mobile device over a secure wireless network. The system comprises a mobile device for a vehicle, a CVD and at least one off-vehicle source of data. The mobile device comprises a mobile application. The CVD comprises on-vehicle data for a vehicle. The at least one off vehicle source selected from a group comprising at least one database, at least one cloud source, or at least one physical structure with a communication device. The mobile application is configured to access and combine off-vehicle content with on-vehicle data in order to enable, disable or manage at least one function of the mobile device.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

The present invention preferably allows an assigning authority or an app on a mobile device to access data (e.g., driver events, data events, or sensor events data) and to inform an instruction set based on off-vehicle and/or on-vehicle data.

The assigning authority is preferably configured to access and combine off-vehicle content and/or on-vehicle data in order to enable, disable, or manage at least one function of a mobile device connected to a CVD of a vehicle.

The instruction set is preferably generated from the assigning authority but resides in the mobile devices. Alternatively, the instruction set is generated at or for a mobile application residing on a mobile device for a vehicle.

The MDM (Mobile Device Management) reacts to the conditions and manages the devices. The MDM preferably does the following: tells the tablet computer (or other mobile device) what a driver can do and when they can do it; adapts to the current environment as informed by an RPM; and has mobile device edge self-healing which is used to diagnose and troubleshoot (because the RPM can troubleshoot in an encompassing method).

A secure communication protocol (SCP) may be used to provide a secure connection to a mobile device from a server. A dynamic MDM can enable, disable (limit access/views), or manage at least one function on the mobile device.

For example, wheels in motion-limiting access: in this example, the assigning authority is configured to enable or disable at least one application on the mobile device based on the vehicle, timing, event, and/or positioning ("VTEP") data (e.g., based on vehicle drive status or duty status). The dynamic MDM uses multiple data points to detect wheel speed and the dynamic MDM sends these data points over the secure wireless connection to the mobile device. The mobile device accesses the assigning authority's instruction set and disables, enables, or manages the mobile device functionalities and/or applications.

In another example, the assigning authority provides an instruction set to the mobile device that uses multiple data points to recognize the presence of an attached trailer and enable temporary access on the connected mobile device to additional functionality and/or Apps (e.g., access to an off-vehicle data source, temporary access, delivery instructions, or access protocols to a location (e.g., a delivery location, a building, a gate, an access controlled point of entry, a parking structure, a weigh station, a toll collection structure, a fueling equipment, a vehicle service equipment).

Figure 1:
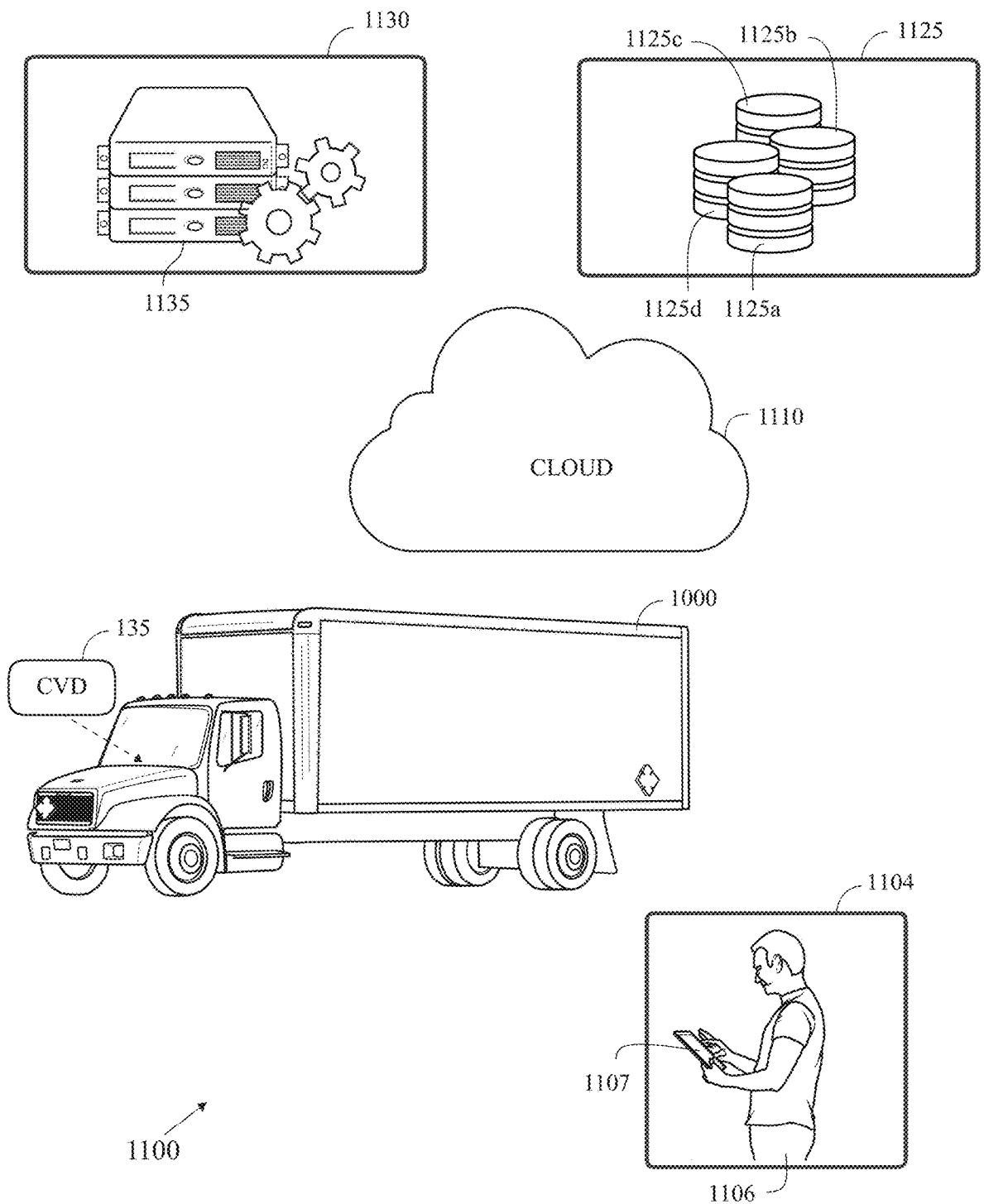
FIG. 1 is a block diagram of a system for remote profile management for utilizing data and computational information from on-vehicle and off-vehicle sources.

FIG. 1 is a block diagram of a system 1100 for controlling a function of a mobile device over a secure wireless network. The system 1100 comprises a mobile device 1107 for a vehicle 1000, a connected vehicle device (CVD) 135 comprising on-vehicle data for a vehicle 1000, and at least one off vehicle source selected from a group comprising at least one database of a plurality of databases 1125, at least one cloud source, or at least one physical structure with a communication device. The system 1100 is configured to access and combine off-vehicle content with on-vehicle data in order to enable, disable or manage at least one function of the mobile device 1107 over a secure wireless network. The system 1100 also includes a remote profile manager (RPM) toolset 1130 with an RPM sync program 1135, and a plurality of databases 1125, both accessible through the cloud 1110. A vehicle 1000 preferably includes a CVD 135. The remote profile manager toolset 1130 preferably includes a server 1135. The plurality of databases 1125 is preferably composed of multiple databases 1125a-d.

In a preferred embodiment, the mobile device 1107 comprises a remote profile manager (RPM) toolset, wherein the RPM is configured to execute the plurality of dynamic, temporal combinations to access vehicle, timing, event, and/or positioning ("VTEP") data to inform the plurality of instruction sets communicated by the assigning authority engine, and wherein the RPM is configured to use one or more elements of the VTEP data to synchronize on-vehicle data elements or a computational output of the off-vehicle content, to generate a new information data set combination.

Figure 2:
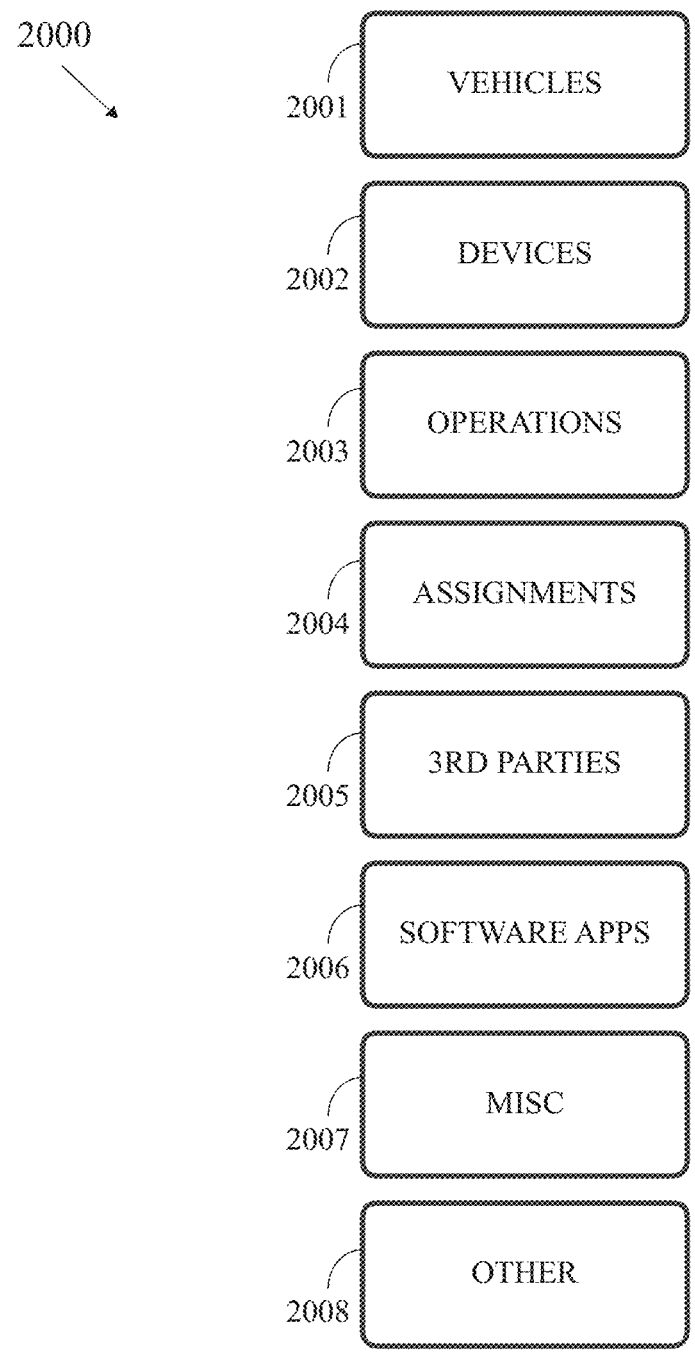
FIG. 2 is a block diagram of sources of data for remote profile management for a vehicle.

FIG. 2 is a block diagram of a set 2000 of sources of data (off-vehicle and on-vehicle) for remote profile management for a vehicle. The set 2000 preferably includes vehicles 2001, devices 2002, operations 2003, assignments 2004, third parties 2005, software apps 2006, miscellaneous 2007 and other 2008.

Figure 3:
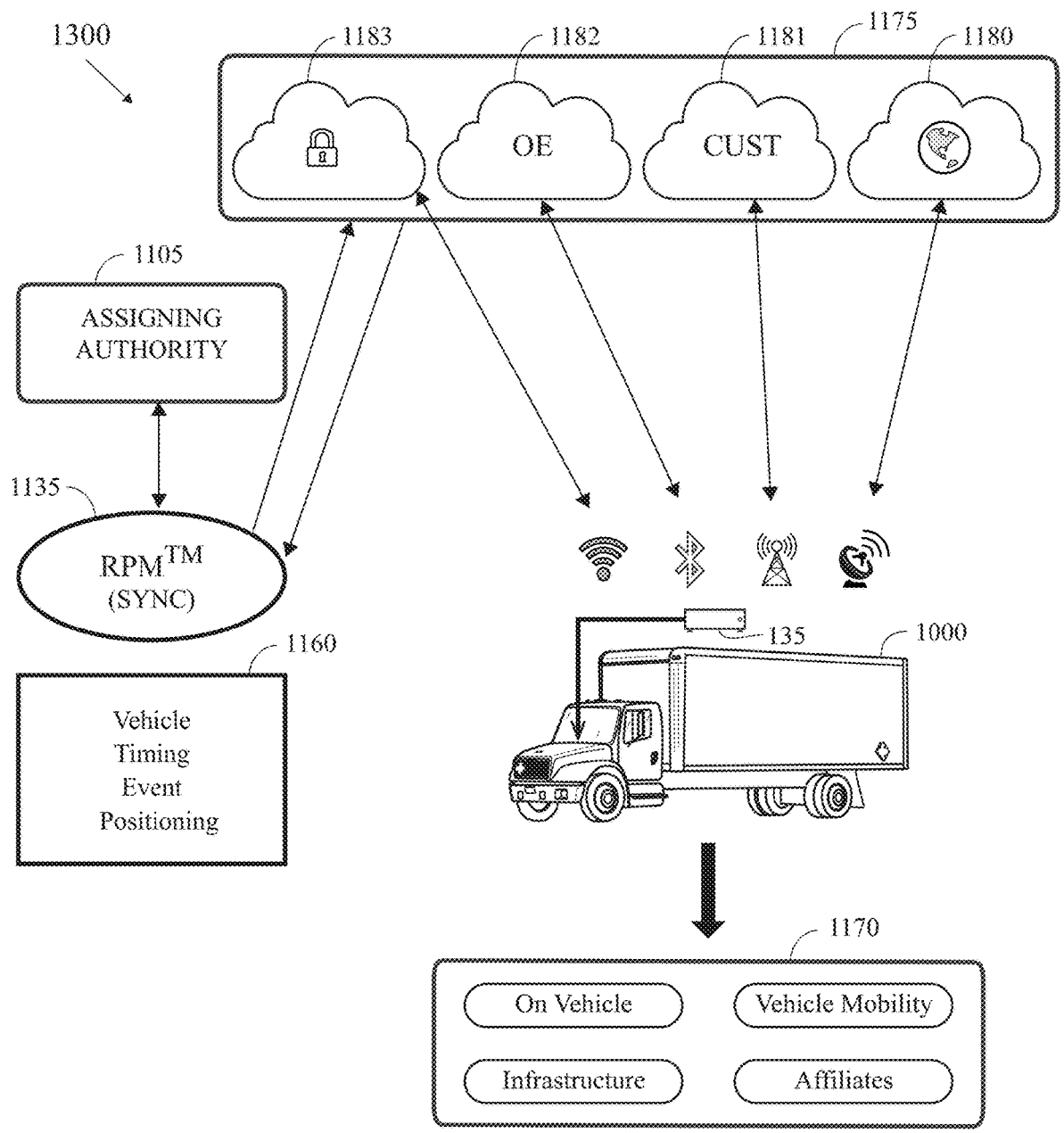
FIG. 3 is a block diagram of a system for remote profile management for utilizing data and computational information from on-vehicle and off-vehicle sources.

FIG. 3 is a block diagram of a system 1300 for controlling a function of a mobile device over a secure wireless network utilizing data and computational information from on-vehicle and off-vehicle sources. As shown in FIG. 3, the system 1300 comprises an assigning authority engine 1105, a remote profile manager toolset 1130, databases (FIG. 2), cloud sources, a vehicle 1000 and a CVD 135 within the vehicle 1000. The cloud sources 1175 include main protected server/cloud 1183, an original equipment manufacturer server/cloud 1182, a customer server/cloud 1181 and a public server/cloud 1180. Multiple other servers/clouds and/or databases can be utilized with the present invention without departing from the scope and spirit of the claims such as a hybrid cloud source, a private cloud source, or a multi-cloud source. The cloud sources, databases, RPM 1130 and assigning authority engine 1105 communicate with the CVD 135 utilizing various wireless communication protocols including WiFi, cellular networks, BLUETOOTH, GPS, and the like. The contents of each of the databases (2001-2008) and cloud sources are accessible and combinable by the assigning authority engine 1105 to produce dynamic, temporal combinations of data elements and instructions for the vehicle 1000. The assigning authority engine 1105 is configured to use the remote profile manager toolset 1130 to execute the dynamic, temporal combinations. The dynamic, temporal combinations access data from the cloud sources comprising third party data and vehicle, timing, event, and/or positioning ("VTEP") data 1160 to inform instruction sets delivered by the assigning authority engine 1105. The instruction sets are preferably temporal permission for the on-vehicle sources and off-vehicle sources (e.g., applications) to connect and share data with each other. One or more elements of the VTEP data 1160 is used as the basis to synchronize timing between the data, or computational outputs of two or more sources of electronic information. A single coherent information picture 1170 is formed from fusing data and computational information from the on-vehicle and the off-vehicle sources. The new information data set combination (single coherent information picture) is a display of information generated from the combination of data from the on-vehicle sources and the off-vehicle sources. The data set can include dynamic route information (road condition changes due to weather, construction and the like), an updated driver's profile, vehicle engine date, cargo data, dynamic compliance rules, micro-navigation data, fuel stop data, inspection stations on the route, wireless communications connectivity status, time to destination, and the like. An example of a new information data set combination is imparting GPS location data from a truck/CVD onto cargo (the potato chips example). The new information data set combination is preferably any new combination of the connected data sources data for the specific vehicle of interest.

The assigning authority engine 1105 preferably has a work assignment that has been generated for a specific vehicle 1000. In a preferred embodiment, the assigning authority engine 1105 resides at a server for the system 1100, and the RPM toolset 1130 resides at a separate server. Alternatively, the assigning authority engine 1105 and the RPM toolset 1130 reside at the same server. The assigning authority engine 1105 preferably instructs the mobile device 1107 for permitted actions by an operator 1106 of the vehicle 1000 and/or time frames for the permitted actions. The assigning authority engine 1105 is preferably configured to access and combine off-vehicle content and on-vehicle data, along with the work assignment, to produce dynamic, temporal combinations of data elements and instructions for the vehicle 1000. Additionally, the assigning authority engine 1105 provides permission to various applications to share data for app-to-app integration. In one example, the assigning authority engine 1105 grants permission to a workflow application running on a mobile communication device for the vehicle 1000 to obtain data from a navigation application running on the mobile communication device. The assigning authority engine 1105 instructs the navigation application to hare the data with the workflow application. In one specific example, the share data is GPS coordinates for the vehicle.

The assigning authority 1105 is preferably configured to adapt to a present environment based on data from the RPM toolset 1130. The RPM toolset 1130 is preferably configured to provide edge self-healing to the mobile device 1107. The assigning authority engine 1105 is preferably configured to authorize at least one cloud source to directly receive data from or provide data to the CVD 135, an authorized cloud provider, or an authorized user granted access by the assigning authority engine 1105. In one embodiment, the assigning authority engine 1105 is preferably configured to enable, disable or manage the at least one function of the mobile device 1107 over a secure wireless network based on VTEP data. The VTEP data preferably includes at least one of gear position, speed, fuel level, rotations per minute, location, drive status, seatbelt use, windshield wiper function. Enabling, disabling, and managing functions preferably comprises at least one application, at least one feature, or at least one widget, is based on an operator profile, or is an user interface page in an mobile application on the mobile device 1107. Alternatively, enabling, disabling, or managing functionality is based on an operator positioned away from the vehicle.

Figure 14:
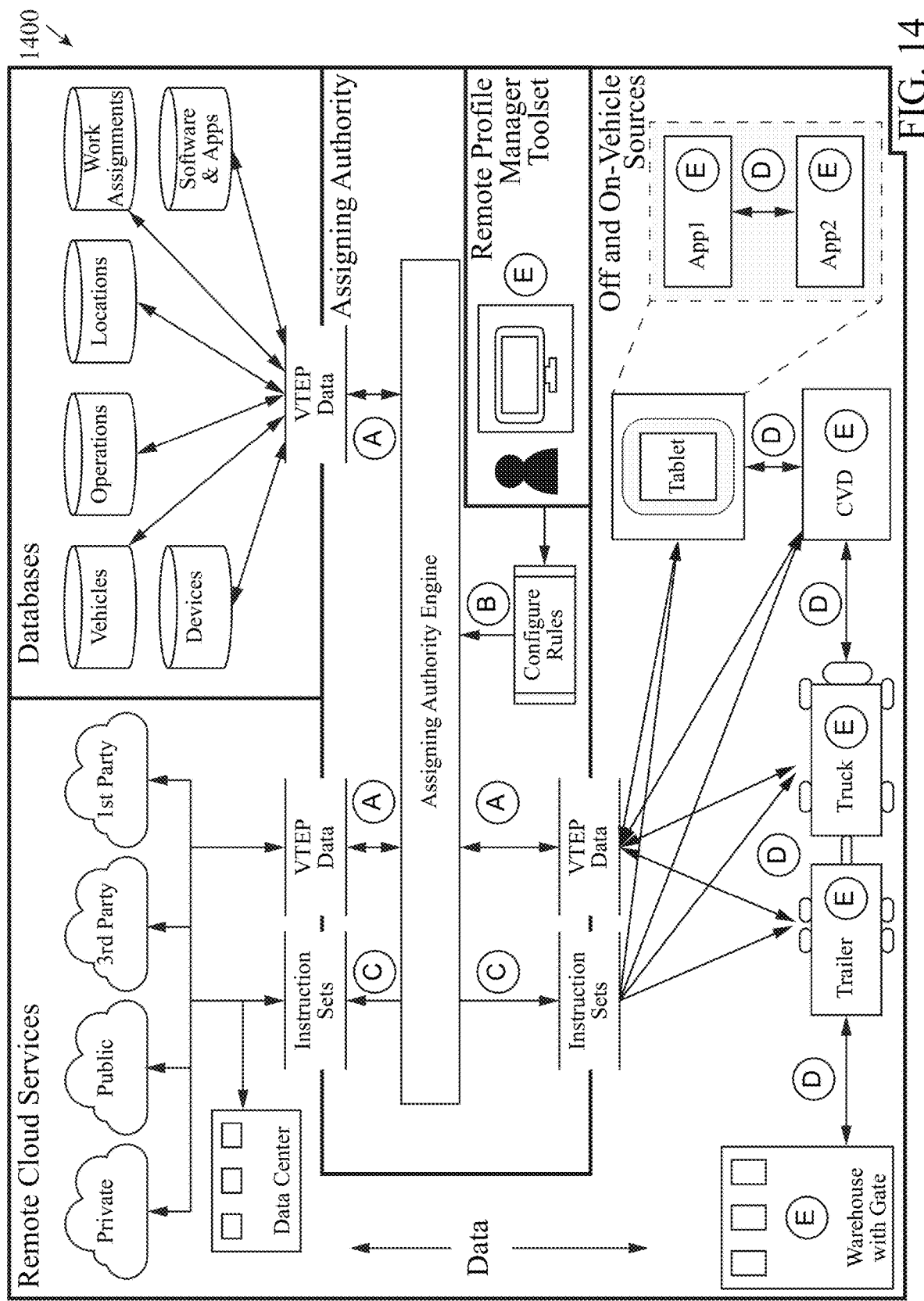
FIG. 14 is a block diagram of a system for remote profile management for utilizing data and computational information from on-vehicle and off-vehicle sources.

FIG. 14 is a block diagram of a system 1400 for remote profile management for utilizing data and computational information from on-vehicle and off-vehicle sources. At step A, VTEP data is gathered from multiple databases, cloud services and other off-vehicle sources, as well as on-vehicle sources. At step B, the RPM toolset is used to configure multiple assigning authority rules based on the collected VTEP data. At step C, multiple instruction sets are delivered to multiple cloud services, other off-vehicle sources and on-vehicle sources. At step D, off-vehicle sources such as physical infrastructure, vehicles, mobile devices, and mobile device applications share data per the delivered instruction sets. At step E, back office managers, physical infrastructure, on-vehicle and off-vehicle sources are provided with new information data set combinations enabling novel processing capabilities for the system.

In one embodiment, the off-vehicle source is a mobile application operating on a mobile device 1107, and the data originates from the mobile application.

In another embodiment, app to app integration is utilized to generate the information data set. The app to app integration is performed at a remote server, within an app on a mobile device, on a CVD or a combination thereof.

The cloud sources preferably comprise a public cloud source, a private cloud source, a hybrid cloud source, a multi-cloud source, a service provider cloud, a telematics service provider cloud, an original equipment manufacturer cloud (truck manufacturer, Tier 1 supplier, device supplier and the like), a customer cloud (end user) and/or a public cloud.

The system also preferably includes physical infrastructures with communication devices comprising at least one of a building, a gate, an access controlled point of entry, a parking structure, a weigh station, a toll collection structure, a fueling equipment and a vehicle service equipment. In one embodiment, a passive device on a physical structure broadcasts a unique ID which is received by a mobile device and a vehicle gateway device. If the passive device is a BLUETOOTH device, it broadcasts a BLUETOOTH advertisement.

Multiple vehicle connected mobility devices are preferably used with the system 1600 and comprise at least one of a tablet computer, a mobile phone, a scanning device, a beacon, a RF passive or active communication device and a signature capture device.

Affiliates with the system 1600 include at least one of another vehicle authorized to share data via vehicle-to-vehicle (V2V), Cloud, or other RF communication protocols, a TMS system authorized by the assigning authority engine 1105 to directly take data from or provide data to the vehicle CVD 135, an authorized cloud provider, and an authorized user granted access by the assigning authority.

The vehicle 1000 is preferably one of a long-haul semi-truck, a bus, a sedan, a pick-up, a sports utility vehicle, a limousine, a sports car, a delivery truck, a van, or a mini-van.

As shown in FIG. 3, the vehicle 1000 has multiple endpoints with direct connectivity to the CVD 135, and requires no routing through a cloud service. The endpoints are user interfaces or built in displays, devices connected through fixed or wireless connection to the vehicle's CVD 135, sensors connected through a vehicle bus (see FIG. 4A) to the CVD 135, or directly to the CVD 135 via wired or wireless connection, like devices. The vehicle 1000 is preferably a primary generator and source of VTEP data 1160.

The RPM 1130 preferably comprises a RPM sync 1135 for syncing with other devices, servers, the Cloud, the CVD and the like.

The real-time data for the vehicle 1000 preferably comprises a real-time speed of the vehicle, tire pressure values from a plurality of tire sensors, refrigeration/HVAC unit values, a plurality of fluid levels, a plurality of power unit values, a real-time fuel tank capacity, and a fuel type.

The plurality of configurable real-time vehicle data trigger events comprises a value outside of a predetermined range for the real-time data of the vehicle.

The real-time driver/operator profile comprises amount of time driving during a pre-determined time period, number of rest breaks during the pre-determined time period, license compliance data, physical disabilities and driving violations.

One example of an off-vehicle source is a fuel stop. A profile of a fuel stop preferably comprises real-time types of fuels available, set billing instructions, physical dimensions of a plurality of fuel pumps, GPS coordinates, hours of operation, food service availability, and resting area availability. The predetermined fueling time period is a time range to fuel the vehicle based on the real-time GPS location of the vehicle, the real-time speed of the vehicle, the distance to the selected fuel stop from the real-time GPS location of the vehicle, and the hours of operation of the fuel stop.

A configuration of the vehicle 1000 is preferably selected from one of a single trailer, a dual trailer, a triple trailer, and a refrigeration trailer.

Another example of an off-vehicle source is a database (Federal, State local) with dynamic compliance rules. The dynamic compliance rules comprise speed limits, transport of toxic waste, the transport of refrigerated cargo, the rest durations for drivers/operators, the necessary insurance coverage, and the type of taxes and fees to be paid.

The workflow utilized by the assigning authority engine 1105 preferably comprises an origination location of the vehicle, a destination of the vehicle, a route to the destination, a cargo, a time of departure and a time of arrival.

In one non-limiting example, the assigning authority engine 1105 receives data over the cloud from a customer server 1181 that a shipment of bags of potato chips were damaged in transit. The assigning authority engine 1105 accesses a CVD 135 or mobile device for the vehicle that delivered the bags of potato chips to determine the origination location, the destination location and the route. The assigning authority engine 1105 uses a navigation app on the mobile device (tablet computer) to determine the route, and an elevation of the route. The assigning authority engine 1105 determines that the vehicle traveled over a high elevation mountain range that probably resulted in the damage to the bags of potato chips due to a pressure differential. The assigning authority engine 1105 uses this information to reroute a subsequent shipment of bags of potato chips to avoid the high elevation mountain range.

Figure 4:
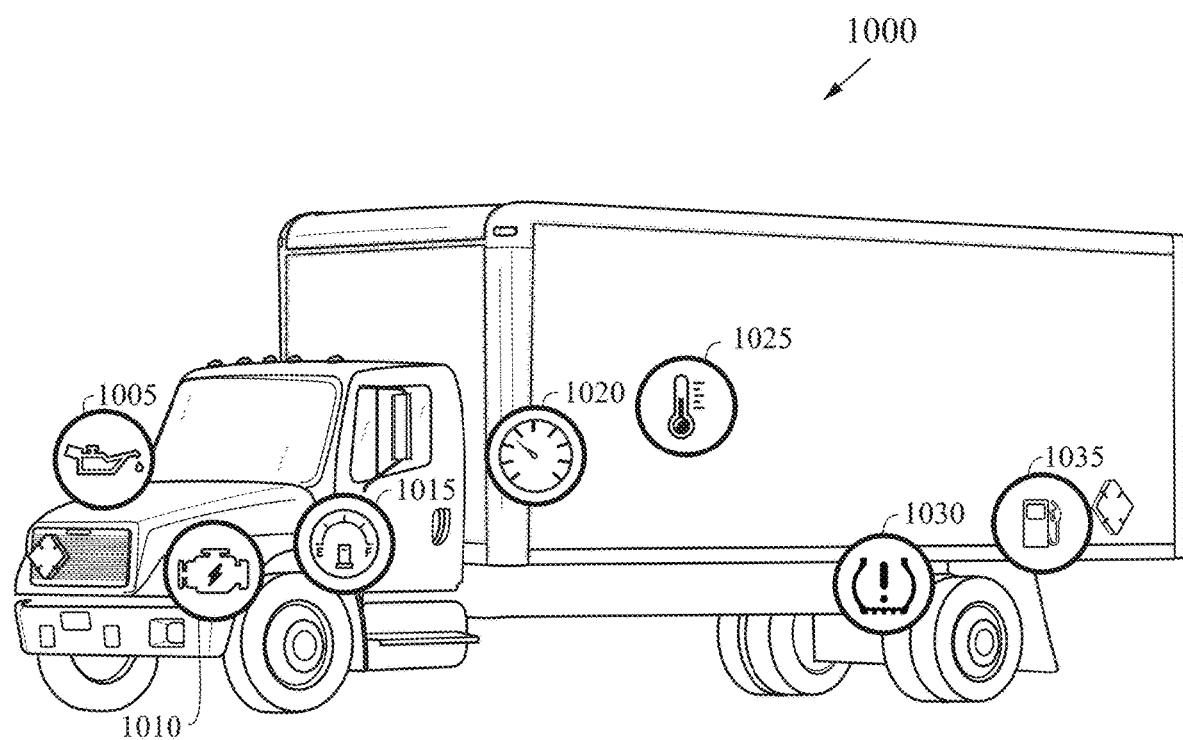
FIG. 4 is an illustration of multiple sensors on a truck.
Figure 4A:
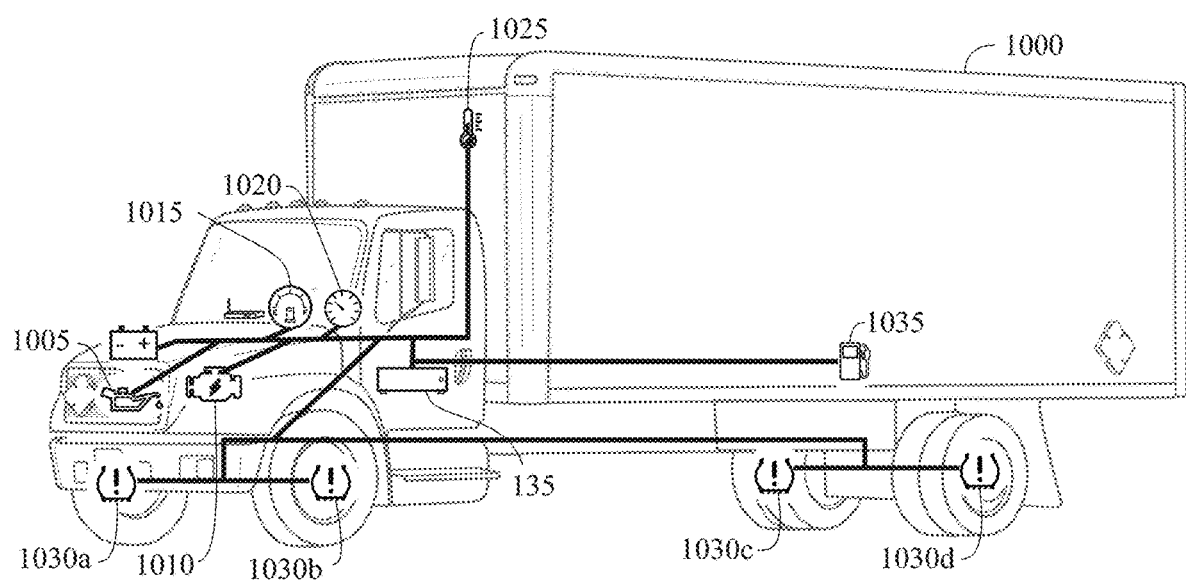
FIG. 4A is an illustration of multiple sensors on a truck connected to a BUS for the truck.

FIG. 4 is an illustration of multiple sensors on a truck 1000. The vehicle/truck 1000 preferably comprises an oil level sensor 1005, an engine sensor 1010, a power sensor 1015, a refrigeration/HVAC sensor 1020, a temperature sensor 1025, a tire pressure sensor 1030, and a fuel sensor 1035. Those skilled in the pertinent art will recognize that multiple other sensors may be utilized without departing from the scope and spirit of the present invention. FIG. 4A is an illustration of multiple sensors on a truck connected to a data bus for the truck. Each of the sensors (oil level sensor 1005, engine sensor 1010, a power sensor 1015, a refrigeration/HVAC sensor 1020, a temperature sensor 1025, tire pressure sensors 1030a-d, and fuel sensor 1035) is preferably connected to the data bus for transferring data to an on-board computer of the vehicle 1000, or directly to the CVD 135. Alternatively, some or all of the sensors use wireless communications to communication with the CVD 135. This on-vehicle data is accessed from the CVD 135 by the mobile device 1107 for the vehicle 1000, and combined with the off-vehicle content in order to enable, disable or manage at least one function of the mobile device over a secure wireless network.

Figure 5:
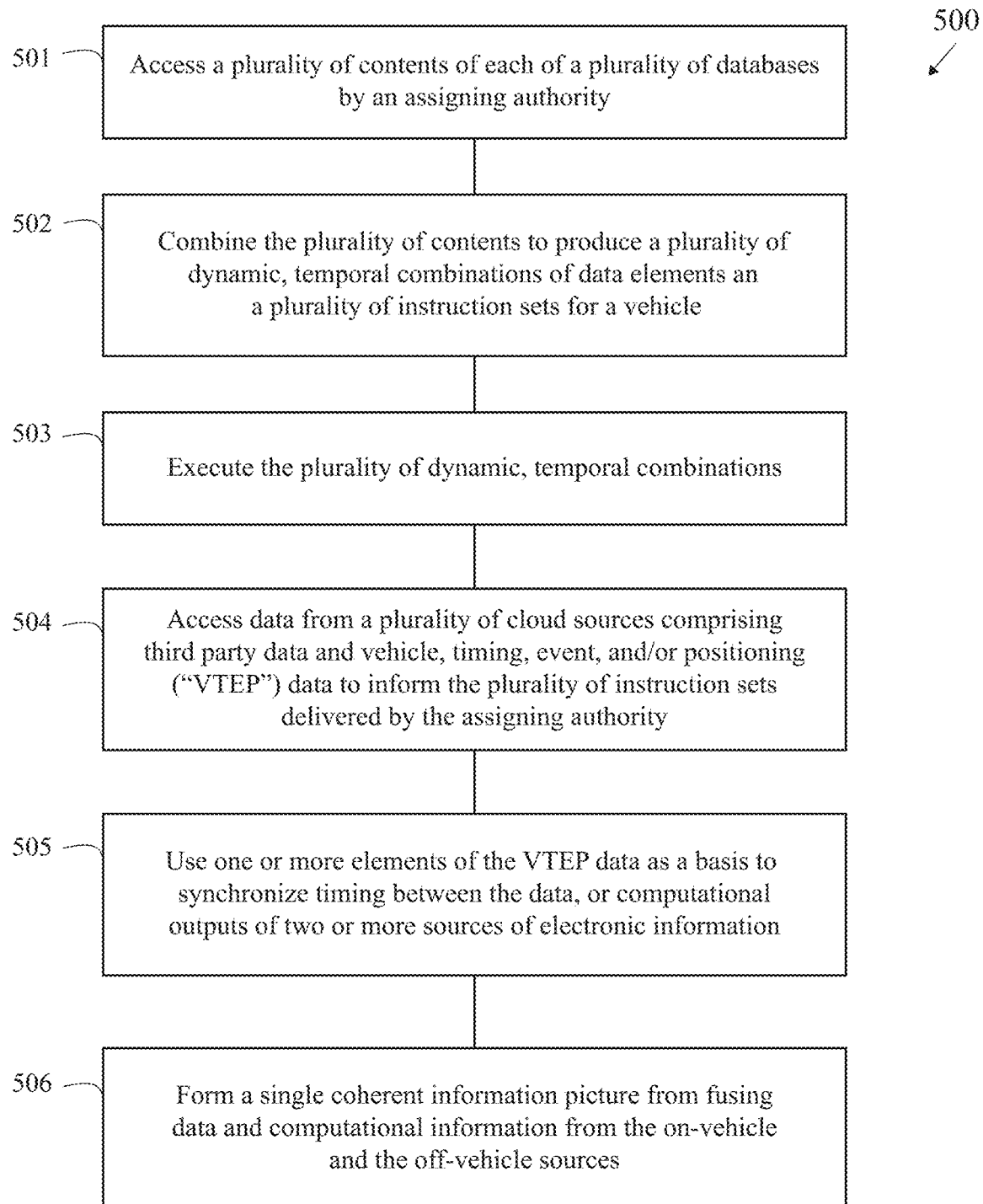
FIG. 5 is a flow chart for a method for remote profile management for utilizing data and computational information from on-vehicle and off-vehicle sources.

FIG. 5 is a flow chart for a method 500 for remote profile management for utilizing data and computational information from on-vehicle and off-vehicle sources. At block 501, the contents of each of a plurality of databases are accessed by an assigning authority engine. At block 502, the contents are combined to produce a plurality of dynamic, temporal combinations of data elements and a plurality of instruction sets for a vehicle. At block 503, the plurality of dynamic, temporal combinations is executed. At block 504, data from a plurality of cloud sources comprising third party data and vehicle, timing, event, and/or positioning ("VTEP") data is accessed to inform the plurality of instruction sets delivered by the assigning authority engine to the RPM. At block 505, one or more elements of the VTEP data is used as a basis to synchronize timing between the data, or computational outputs of two or more sources of electronic information. At block 506, a single coherent information picture is formed from fusing data and computational information from the on-vehicle and the off-vehicle sources.

Figure 6:
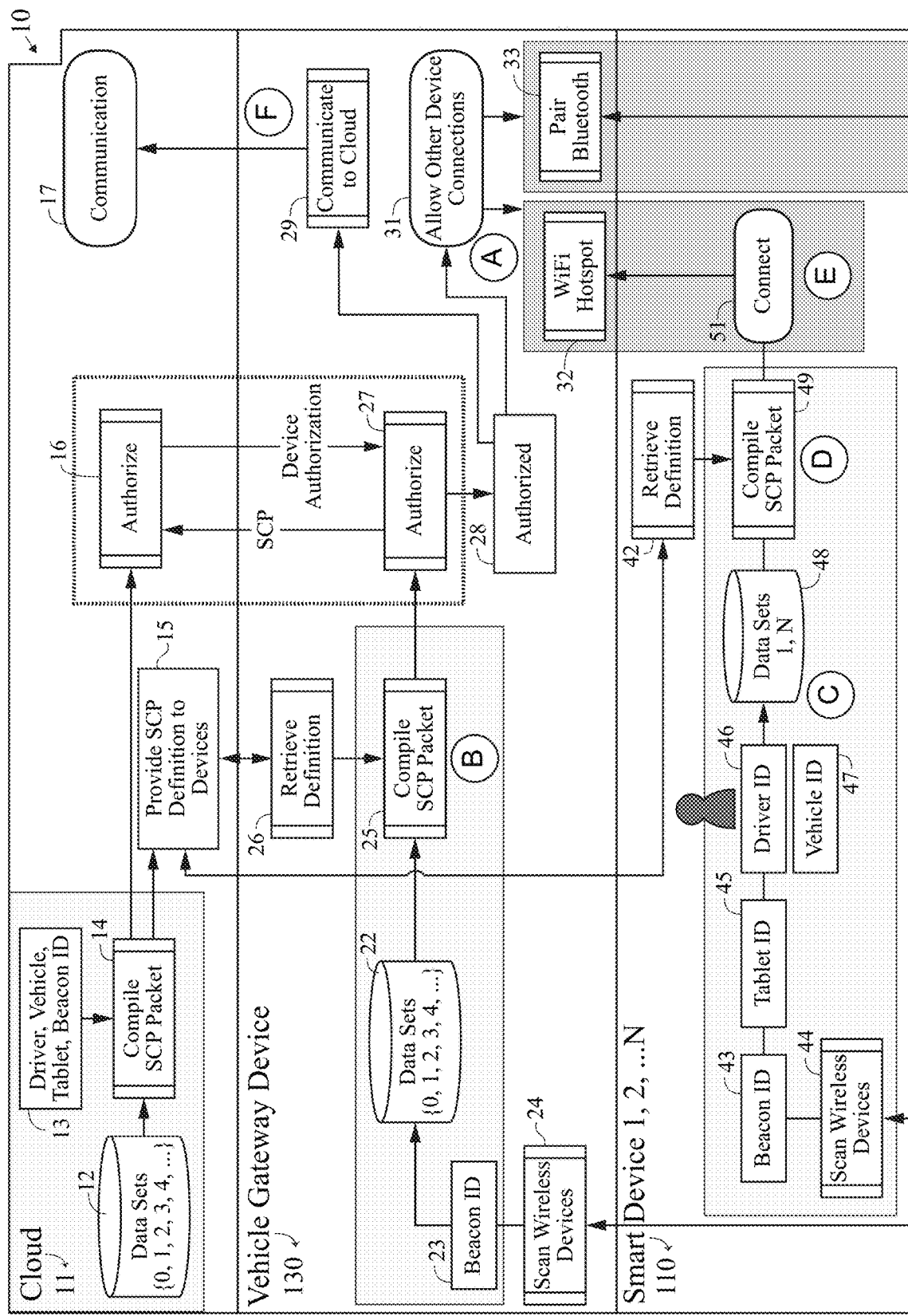
FIG. 6 is a block diagram of system for a secure communication protocol for connecting a wireless device to a single access point in a vehicle.
Figure 6A:
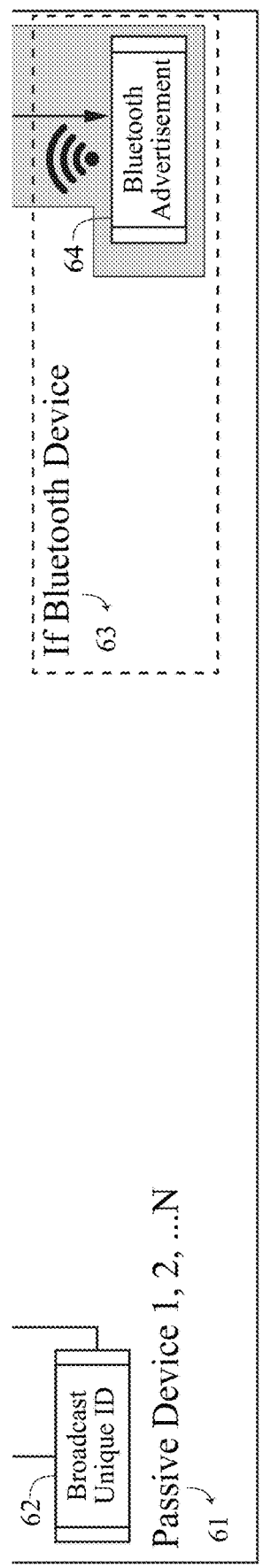
FIG. 6A is a continuation of the block diagram of FIG. 1.

A system 10 for securely connecting a wireless device to a single access point in a vehicle for a predetermined work assignment is shown in FIGS. 6 and 6A. The system 10 preferably comprises a remote server (cloud) 11, a vehicle gateway device 130, a smart device 110 and a passive device

61. The vehicle gateway device 130 is preferably a connected vehicle device ("CVD").

The server/cloud 11 accesses dataset 12 and obtains driver information. Vehicle information, mobile device information (MAC address), passive device information (beacon ID) and other information to compile a SCP packet 14. At block 15, the server 11 provides SCP definitions to the vehicle gateway device 130 and the mobile device 110. At block 16 the server/cloud 11 authorizes the SCP. At block 17, the server/cloud 11 communicates with the vehicle gateway device 130.

The vehicle gateway device 130 uses datasets 22, with the beacon ID 23, a scan of wireless devices 24 along with the SCP definitions 26 received from the server/cloud 11 to compile a CVD compiled SCP packet 25. The CVD compiled SCP packet is sent to the cloud/server 11 at block 16 and authorization/validation of the CVD compiled SCP packet is received at block 27. At block 28 the SCP is authorized for broadcasting at the vehicle gateway device 130 a wireless network with a hidden and hashed SSID unique to the vehicle, the hidden and hashed SSID generated from the validated SCP packet. At block 29, the vehicle gateway device 130 communicates the broadcast with the server/cloud 11. At block 31, the vehicle gateway device 130 communicates with other devices, namely the smart device 110 over preferably a WiFi hotspot 32 and the passive device 61 by pairing using a BLUETOOTH communication protocol at block 33.

At block 49, the smart device (mobile device) 110 compiles a complied mobile device SCP packet from the SCP definitions 42, the data sets 48, the beacon ID 43, the Tablet ID 45, a driver ID 46, a vehicle ID 47 and scan of wireless devices 44. The mobile device 110 generates the hashed SSID and a passphrase from the complied mobile device SCP packet. At block 51, the mobile device 110 connects to the WiFi hotspot 32 of the vehicle device gateway 130.

The passive device 61 broadcast a unique ID at block 62 which is received by the mobile device 110 and the vehicle gateway device 130. At block 63, if a BLUETOOTH device, it broadcasts a BLUETOOTH advertisement at block 64.

The SCP is defined by an assigning authority in the server/cloud 11. The server/cloud 11 sends the SCP definition and any other required data in datasets to the CVD 130 and the mobile device 110. The CVD 130 adds the contextual data from local datasets to the sever-sent data to compile its SCP based definition. The local datasets include data wirelessly scanned from passive devices, preferably transmitting a BLUETOOTH beacon. Other local datasets include information from the vehicle. The CVD 130 sends its compiled SCP packet to the server 11 for authorization. The server 11 verifies the CVD compiled SCP packet, and if valid, the server 11 transmits a validation/approval signal to the CVD 130. The CVD then generates an access point SSID/passphrase with SCP. Likewise, the mobile device 110 utilizes contextual data from local datasets to compile its SCP based on the definitions. The mobile device 110 connects to the access point of the CVD 130 using the SCP. The CVD 130 and the mobile device 110 also connect to the passive device 61 since it is part of the SCP definition.

As used by the assigning authority engine 1105, a predetermined work assignment is a temporal event with a fixed start and completion based on assignable boundary conditions. The assignable boundary condition is at least one of a predetermined time period, a geographical destination, and a set route. Alternatively, the assignable boundary condition is any feature with a beginning and a termination. The assigning authority performed by a person or persons, who have the appropriate authority and mechanisms to assign specific tasks and assets to a specific vehicle: and vehicle operator or custodian, and to assign workflow assignments to same. The predetermined work assignment is assigned to a known person or entity that has its own primary networked device accessible through a password protected user interface, a specific name and password that auto-populates or otherwise automatically satisfies a plurality of credentials requirements, wherein the plurality of credential requirements are automatically available or revoked based on the assignable boundary condition identified in a pairing event.

The CVD 130 preferably broadcasts a WiFi wireless network with a hidden and hashed SSID unique to the host vehicle and protected by a unique, dynamically generated and hashed passphrase. The vehicle ID is entered into an application on the tablet that is then converted to the same hashed SSID and passphrase, which allows the tablet to attempt to connect to the corresponding CVD WiFi network and begin communication.

Figure 7:
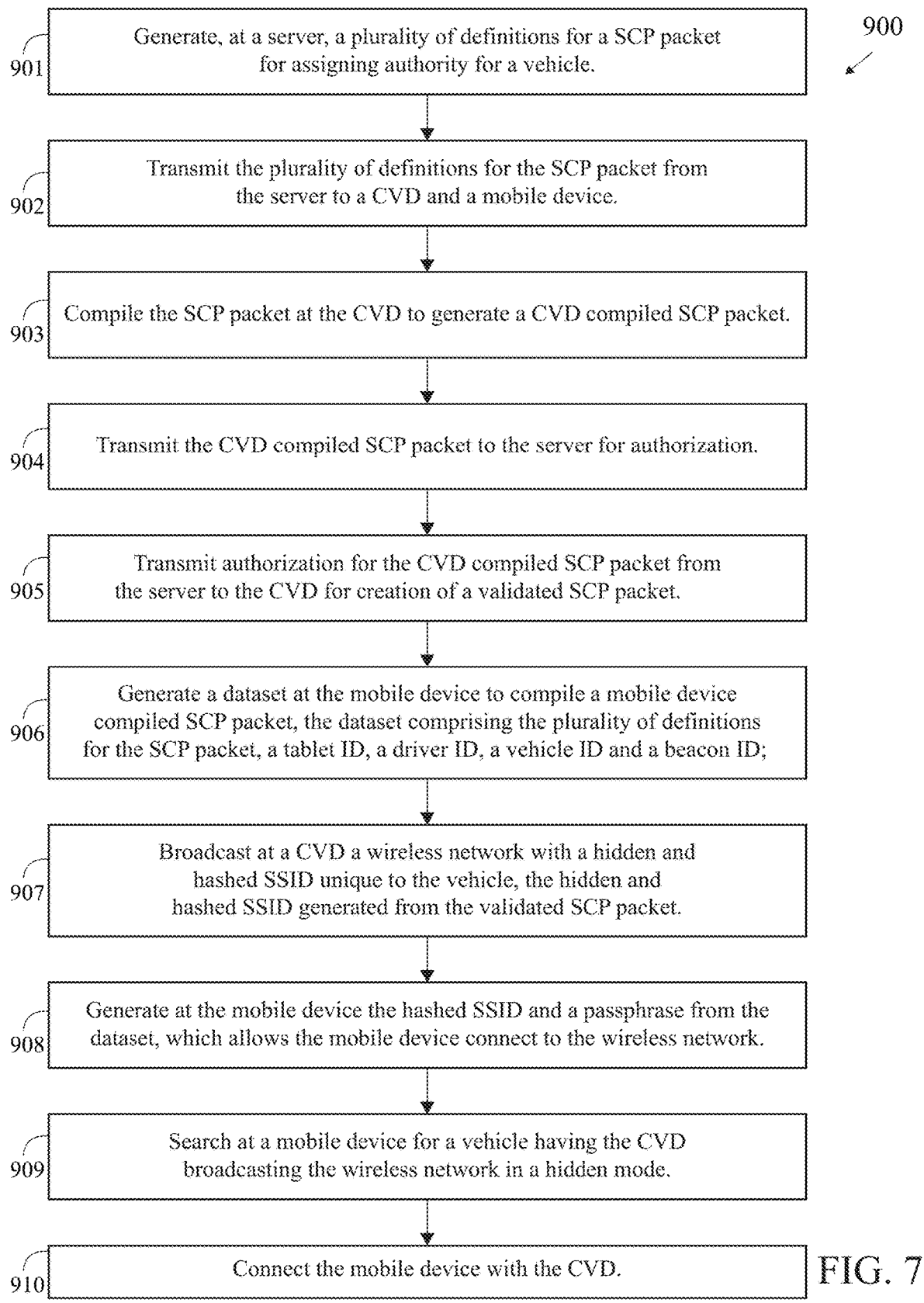
FIG. 7 is a flow chart of a method for a secure connection to a wireless network of a vehicle.

A method 900 for a secure connection to a wireless network of a vehicle is shown in FIG. 7. At block 901, a server generates definitions for a SCP packet for assigning authority for a vehicle. At block 902 the server transmits the definitions for the SCP packet to a CVD and a mobile device. At block 903, the CVD compiles the SCP packet to generate a CVD compiled SCP. At block 904, the CVD transmits the CVD compiled SCP to the server for authorization. At block 905, the server transmits authorization for the CVD compiled SCP from to the CVD for creation of a validated SCP. At block 906, the mobile device generates a dataset to compile a mobile device compiled SCP. At block 907, the CVD broadcasts at a wireless network with a hidden and hashed SSID unique to the vehicle. The hidden and hashed SSID is generated from the validated SCP packet. At block 908, the mobile device generates the hashed SSID and a passphrase from the dataset, which allows the mobile device connect to the wireless network. At block 909, the mobile device searches for a vehicle having the CVD broadcasting the wireless network in a hidden mode. At block 910, the mobile device securely connects with the CVD.

One embodiment utilizes a system for vehicle to mobile device secure wireless communications. The system comprises a vehicle 210, a CVD 130, a mobile device 110 and a passive communication device 61. The vehicle 210 comprises an on-board computer with a memory having a vehicle identification number (VIN), a connector plug, and a motorized engine. The CVD 130 comprises a processor, a WiFi radio, a BLUETOOTH radio, a memory, and a connector for mating with the connector plug of the vehicle. The mobile device 110 comprises a graphical user interface, a mobile application, a processor, a WiFi radio, and a cellular network interface. The passive communication device 61 operates on a BLUETOOTH communication protocol. The server 11 is configured to generate a plurality of definitions for a SCP packet for assigning authority for the vehicle. The server 11 is configured to transmit the plurality of definitions for the SCP packet from the server to the CVD 130 and the mobile device 110. The CVD 130 is configured to compile the SCP packet to generate a CVD compiled SCP. The CVD 130 is configured to transmit the CVD compiled SCP to the server 11 for authorization. The server 11 is configured to transmit authorization for the CVD compiled SCP to the CVD 130 for creation of a validated SCP. The mobile device 110 is configured to generating a dataset to compile a mobile device compiled SCP. The CVD 130 is configured to broadcast a wireless network with a hidden and hashed SSID unique to the vehicle, the hidden and hashed SSID generated from the validated SCP packet. The mobile device 110 is configured to generate the hashed SSID and a passphrase from the dataset, which allows the mobile device connect to the wireless network. The mobile device 110 is configured to search for a vehicle having the CVD broadcasting the wireless network in a hidden mode. The mobile device 110 is configured to connect to the CVD 130 over the wireless network.

The dataset preferably comprises at least one of a plurality of definitions for the SCP packet, a tablet ID, a driver ID, a vehicle ID, a beacon ID, identified or defined entity/participant to the transaction, descriptions, actions, or states of thing, characteristics of identifiable devices, when present in a certain proximity and/or context.

Optionally, the mobile device 110 connects to a passive device, the passive device operating on a BLUETOOTH communication protocol. The passive device 61 is preferably a BLUETOOTH enabled device advertising a unique ID as a beacon or a complex system (speaker, computer, etc.) that emits BLUETOOTH enabled device advertising a unique ID as a beacon.

The mobile device 110 preferably receives input from a driver of the vehicle, and/or the server 11 contains the assigning authority that generates the SCP definitions.

The passive device 61 is preferably an internal device in the vehicle or an external device posted on a gate to a facility and generating a beacon. The beacon from the passive device is preferably a mechanism to ensure that the connection between the mobile device 110 and the CVD 130 occurs at a specific physical location dictated by the assigning authority through the server 11. Preferably, the automatic connection between the mobile device 110 and the CVD occurs because the assigning authority, through the server, has dictated that it occur.

Figure 8:
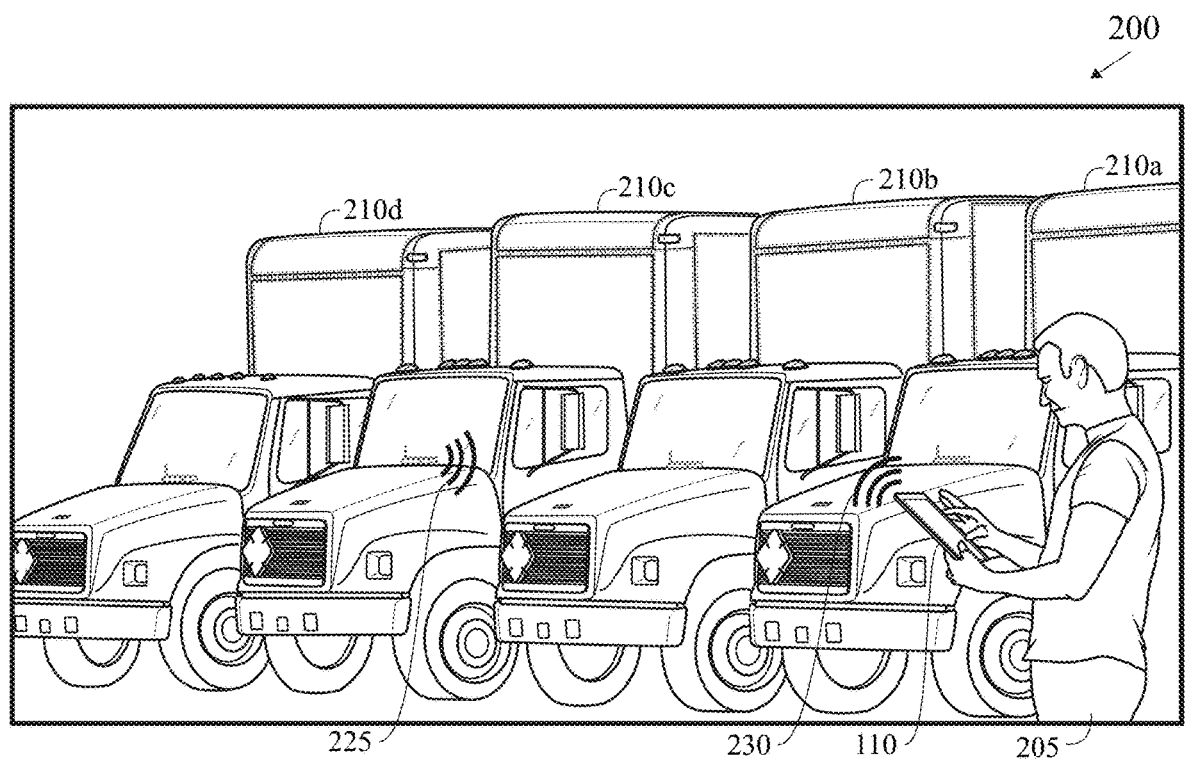
FIG. 8 is an illustration of a driver identifying a vehicle through connection of a tablet computer to an unpublished network.

As shown in FIG. 8, a staging yard for trucks 210a-201d, each of a multitude of trucks 210a-210d broadcast a wireless signal for a truck specific network, with one truck 210c broadcasting a wireless signal 225. However, the SSID is not published so unless a driver is already in possession of the SSID, the driver will not be able to pair the tablet computer 110 with the CVD 130 of the truck 210 to which the driver is assigned. So even though the wireless signals are being "broadcast", they will not appear on a driver's tablet computer 110 (or other mobile device) unless the tablet computer 110 has already been paired with the CVD 130 of the vehicle 210. A driver 205 in possession of a tablet computer 110 pairs, using a signal 230, the tablet computer 110 with the wireless network 225 of the CVD of the truck 210c, and thus the driver locates the specific truck 210c he is assigned to in a parking lot full of identical looking trucks 210a-d.

For example, on an IPHONE® device from Apple, Inc., the "UDID," or Unique Device Identifier is a combination of forty numbers and letters, and is set by Apple and stays with the device forever.

For example, on an ANDROID based system, one that uses Google Inc.'s ANDROID operating system, the ID is set by Google and created when an end-user first boots up the device. The ID remains the same unless the user does a "factory reset" of the phone, which deletes the phone's data and settings.

The mobile communication device 110, or mobile device, is preferably selected from mobile phones, smartphones, tablet computers, PDAs and the like. Examples of smartphones and the device vendors include the IPHONE® smartphone from Apple, Inc., the DROID® smartphone from Motorola Mobility Inc., GALAXY S® smartphones from Samsung Electronics Co., Ltd., and many more. Examples of tablet computing devices include the IPAD® tablet computer from Apple Inc., and the XOOM™ tablet computer from Motorola Mobility Inc.

The mobile communication device 110 then a communication network utilized preferably originates from a mobile communication service provider (aka phone carrier) of the customer such as VERIZON, AT&T, SPRINT, T-MOBILE, and the like mobile communication service providers, provide the communication network for communication to the mobile communication device of the end user.

Wireless standards utilized include 802.11a, 802.11b, 802.11g, AX.25, 3G, CDPD, CDMA, GSM, GPRS, radio, microwave, laser, Bluetooth, 802.15, 802.16, and IrDA.

BLUETOOTH™ technology operates in the unlicensed 2.4 GHz band of the radio-frequency spectrum, and in a preferred embodiment the secondary device 30 and/or primary device 25 is capable of receiving and transmitting signals using BLUETOOTH™ technology. LTE Frequency Bands include 698-798 MHz (Band 12, 13, 14, 17); 791-960 MHz (Band 5, 6, 8, 18, 19, 20); 1710-2170 MHz (Band 1, 2, 3, 4, 9, 10, 23, 25, 33, 34, 35, 36, 37, 39); 1427-1660.5MH (Band 11, 21, 24); 2300-2700 MHz (Band 7, 38, 40, 41); 3400-3800 MHz (Band 22, 42, 43), and in a preferred embodiment the secondary device 30 and/or the primary device 25 is capable of receiving and transmitting signals using one or more of the LTE frequency bands. WiFi preferably operates using 802.11a, 802.11b, 802.11g, 802.11n communication formats as set for the by the IEEE, and in in a preferred embodiment the secondary device 30 and/or the primary device 25 is capable of receiving and transmitting signals using one or more of the 802.11 communication formats. Near-field communications (NFC) may also be utilized.

Figure 9:
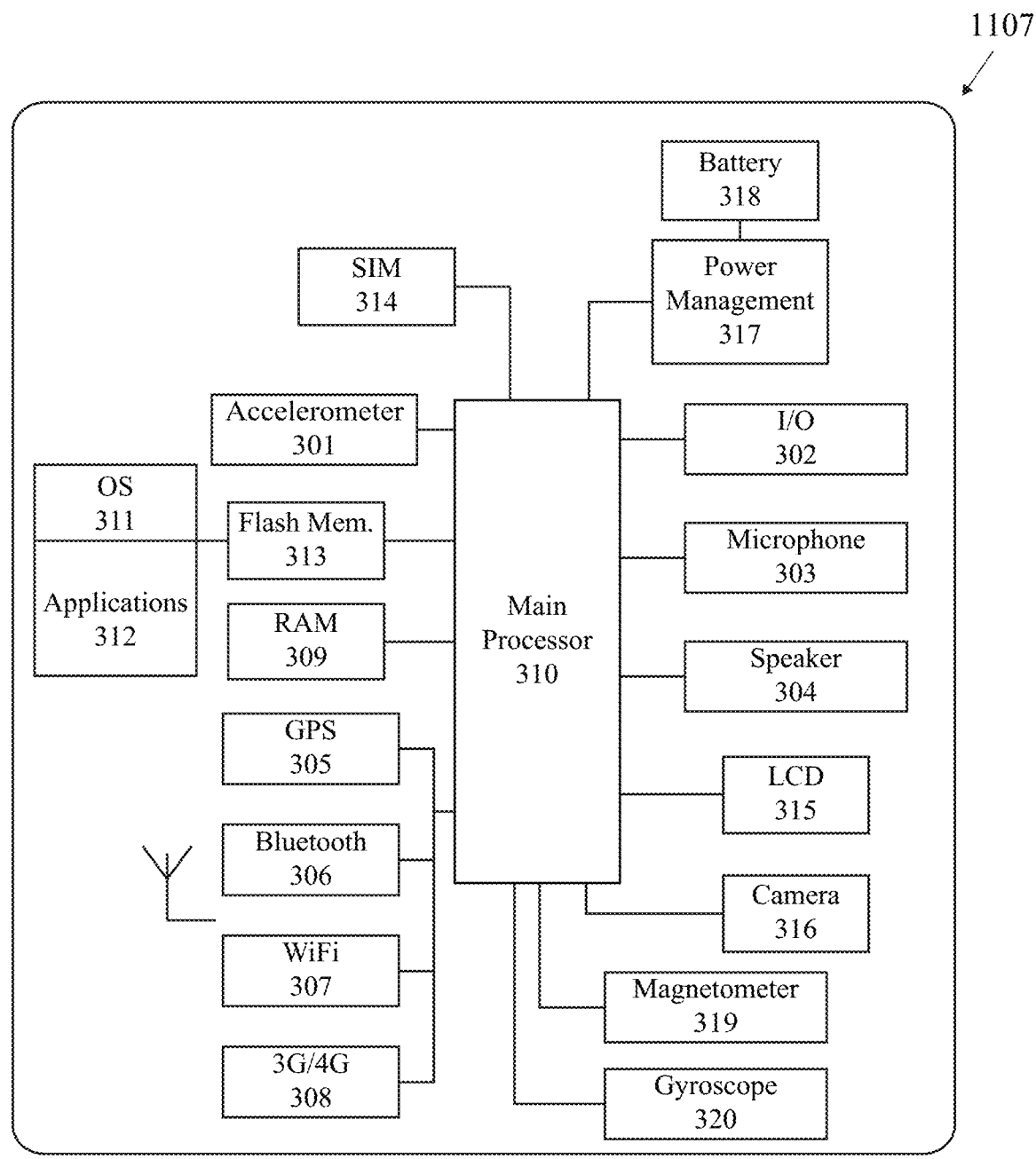
FIG. 9 is an isolated view of general electrical components of a mobile communication device.

As shown in FIG. 9, a typical mobile communication device 1107 preferably includes an accelerometer 301, I/O (input/output) 302, a microphone 303, a speaker 304, a GPS chipset 305, a Bluetooth component 306, a Wi-Fi component 307, a 3G/4G component 308, RAM memory 309, a main processor 310, an OS (operating system) 311, applications/software 312, a Flash memory 313, SIM card 314, LCD display 315, a camera 316, a power management circuit 317, a battery 318 or power source, a magnetometer 319, and a gyroscope 320.

Each of the interface descriptions preferably discloses use of at least one communication protocol to establish handshaking or bi-directional communications. These protocols preferably include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MIMS, GPRS and Flash. Databases that may be used with the system preferably include but are not limited to MSSQL, Access, MySQL, Progress, Oracle, DB2, Open Source DBs and others. Operating system used with the system preferably include Microsoft 2010, XP, Vista, 200o Server, 2003 Server, 2008 Server, Windows Mobile, Linux, Android, Unix, I series, AS 400 and Apple OS.

The underlying protocol at the cloud server 11, is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP"), Secure Hypertext Transfer Protocol ("HTTPS") or other similar protocols. The transmission protocol ranges from SIP to MGCP to FTP and beyond. The protocol at the authentication server 40 is most preferably HTTPS.

Wireless standards include 802.11a, 802.11b, 802.11g, AX.25, 3G, CDPD, CDMA, GSM, GPRS, radio, microwave, laser, Bluetooth, 802.15, 802.16, and IrDA.

Figure 10:
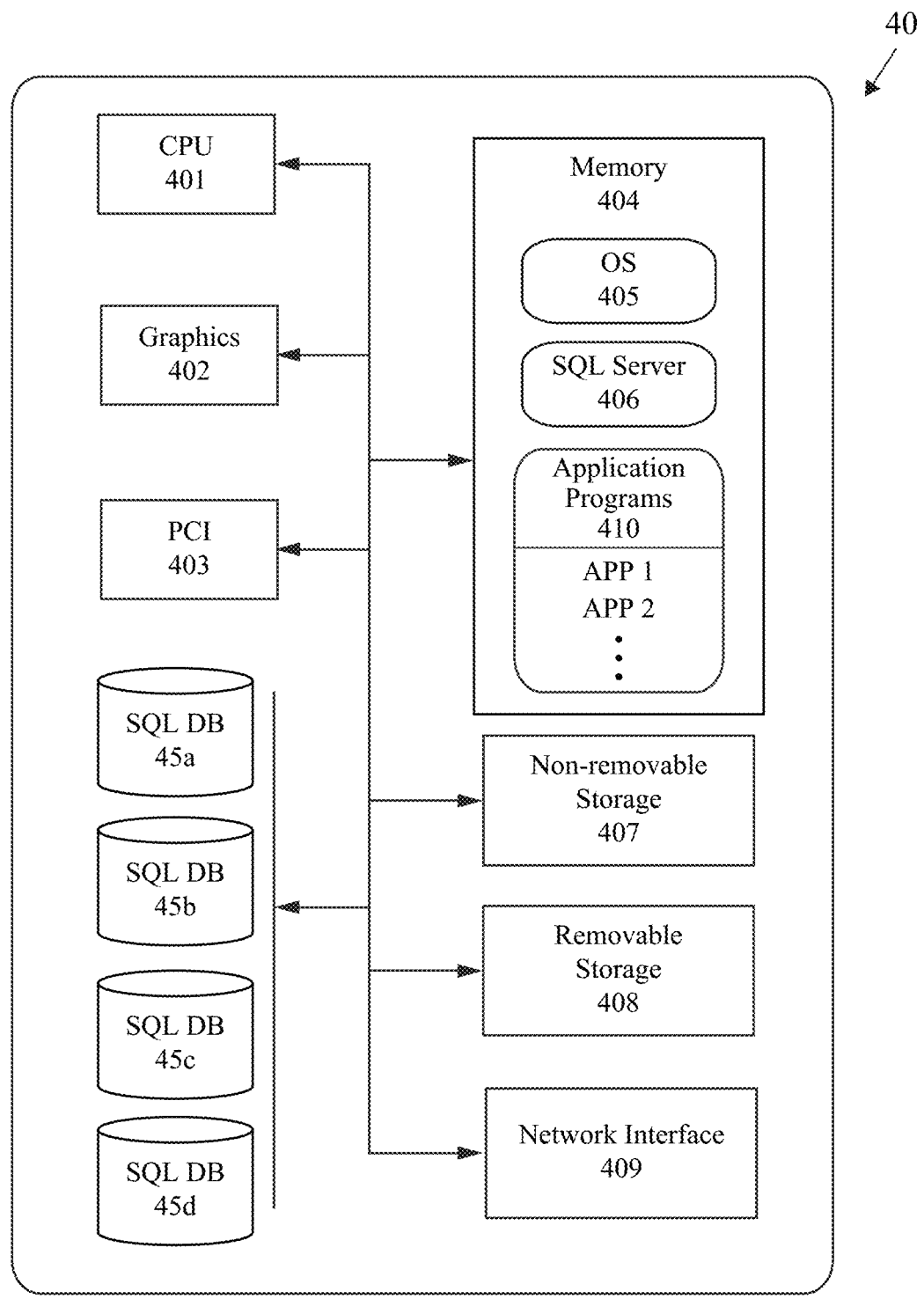
FIG. 10 is an isolated view of general electrical components of a server.

Components of a cloud computing server 40 of the system, as shown in FIG. 10, preferably includes a CPU component 401, a graphics component 402, PCI/PCI Express 403, memory 404, non-removable storage 407, removable storage 408, Network Interface 409, including one or more connections to a fixed network, and SQL database(s) 45a-45d, which includes the venue's CRM. Included in the memory 404, is an operating system 405, a SQL server 406 or other database engine, and computer programs/software 410. The server 40 also preferably includes at least one computer program configured to receive data uploads and store the data uploads in the SQL database. Alternatively, the SQL server can be installed in a separate server from the server 40.

Figure 11:
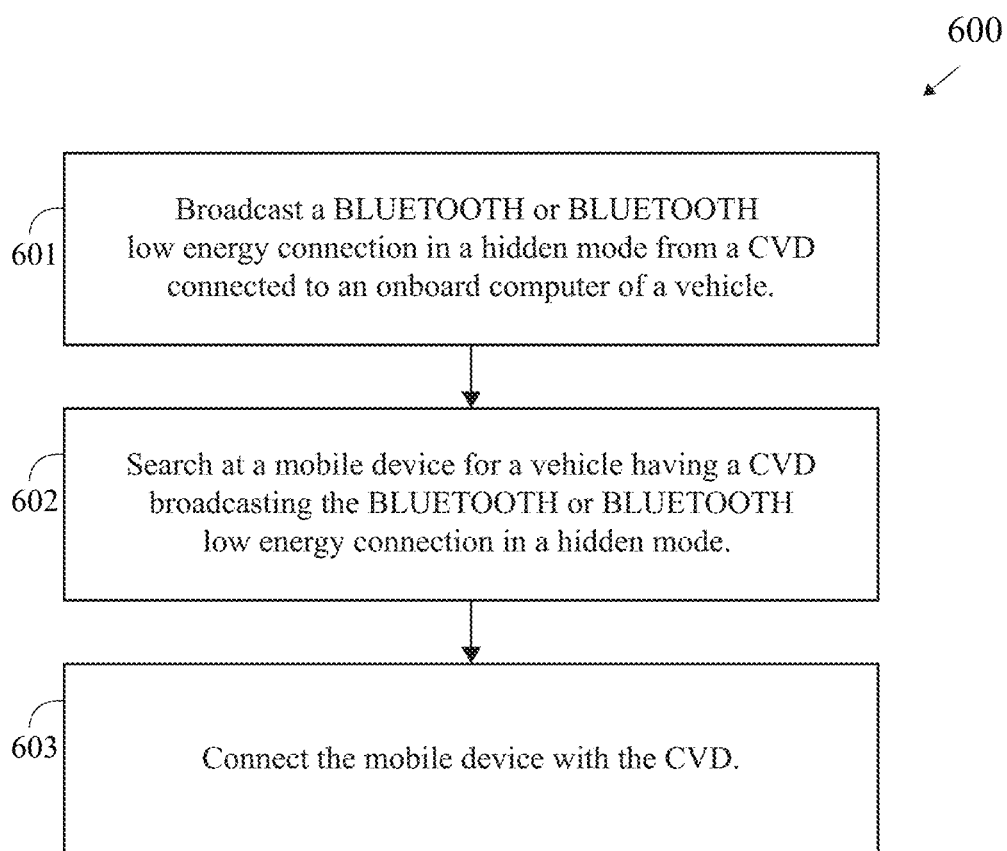
FIG. 11 is a flow chart of method for securely connecting a wireless device to a single access point in a vehicle.

A flow chart for an alternative method 600 for a secure connection to a wireless network of a vehicle is shown in FIG. 11. At block 601, the CVD broadcasts an encrypted, blind SSID based on specific vehicle data. At block 602, leveraging the known vehicle data and the encryption algorithm a mobile device searches for a vehicle having a CVD broadcasting the wireless network. At block 603, the mobile device is connected with the CVD.

Figure 12:
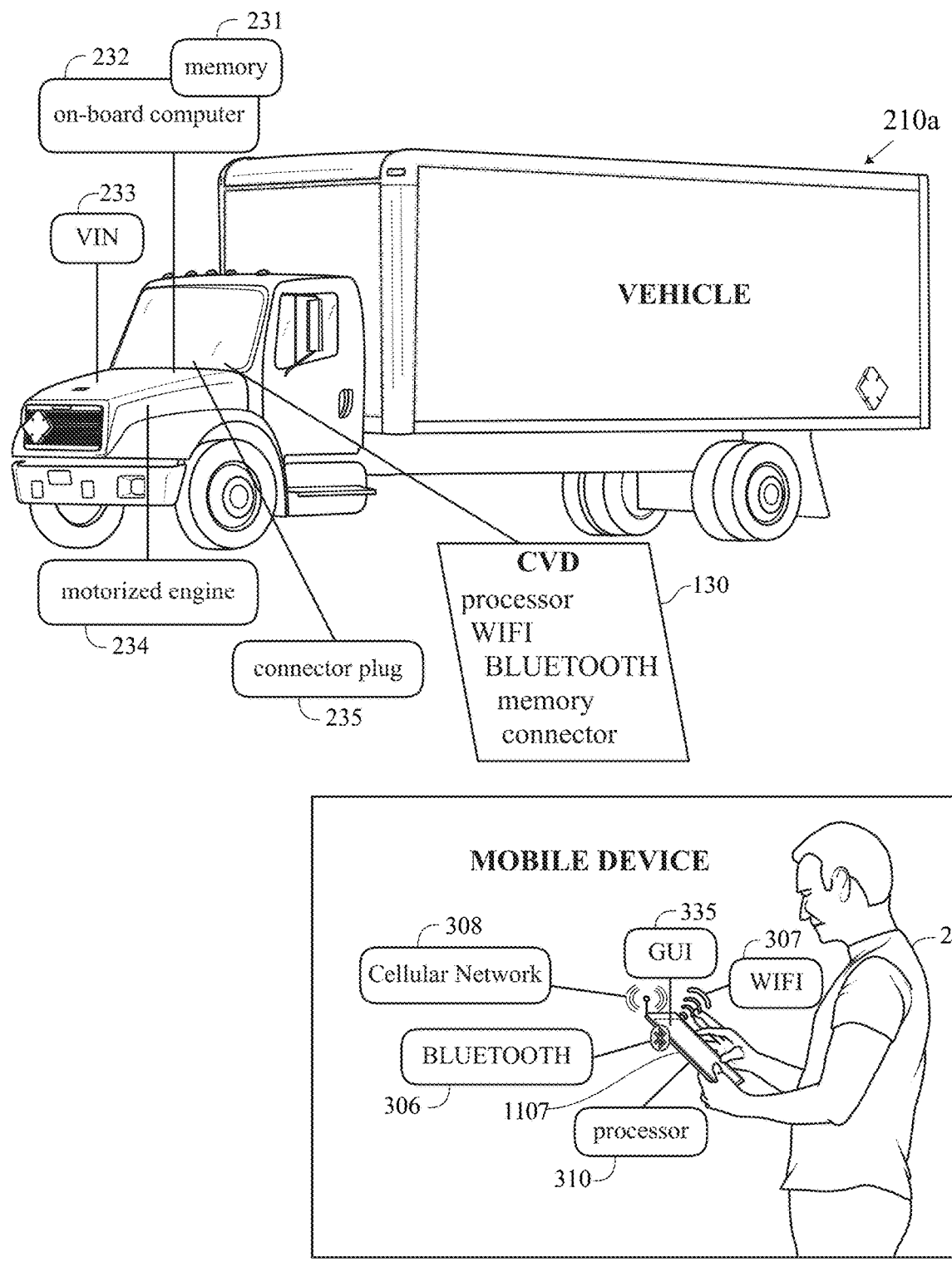
FIG. 12 is an illustration of a system for securely connecting a wireless device to a single access point in a vehicle.

A system for a secure connection to a wireless network of a vehicle is shown in FIG. 12. A truck 210a. Those skilled in the pertinent art will recognize that the truck 210a may be replaced by any type of vehicle (such as a bus, sedan, pick-up, sport utility vehicle, limousine, sports car, delivery truck, van, mini-van, motorcycle, and the like) without departing from the scope of spirit of the present invention. The truck 210a preferably comprises a motorized engine 234, a vehicle identification number ("VIN"), an on-board computer 232 with a memory 231 and a connector plug 235. The on-board computer 232 preferably has a digital copy of the VIN in the memory 231. The on-board computer 232 is preferably in communication with the motorized engine 234. The truck 210a may also have a GPS component for location and navigation purposes, a satellite radio such as SIRIUS satellite radio, a driver graphical interface display, a battery, a source of fuel and other components found in a conventional long distance truck.

Also in the truck 210a is a CVD 130 comprising a processor, a WiFi radio, a BLUETOOTH radio, a memory and a connector to connect to the connector plug of the on-board computer 232.

A driver 205 preferably has a mobile communication device such as a tablet computer 1107 in order to pair with a wireless network generated by the CVD 130 of the truck 210a. The tablet computer 1107 preferably comprises a graphical user interface 335, a processor 310, a WiFi radio 307, a BLUETOOTH radio 306, and a cellular network interface 308.

Figure 13:
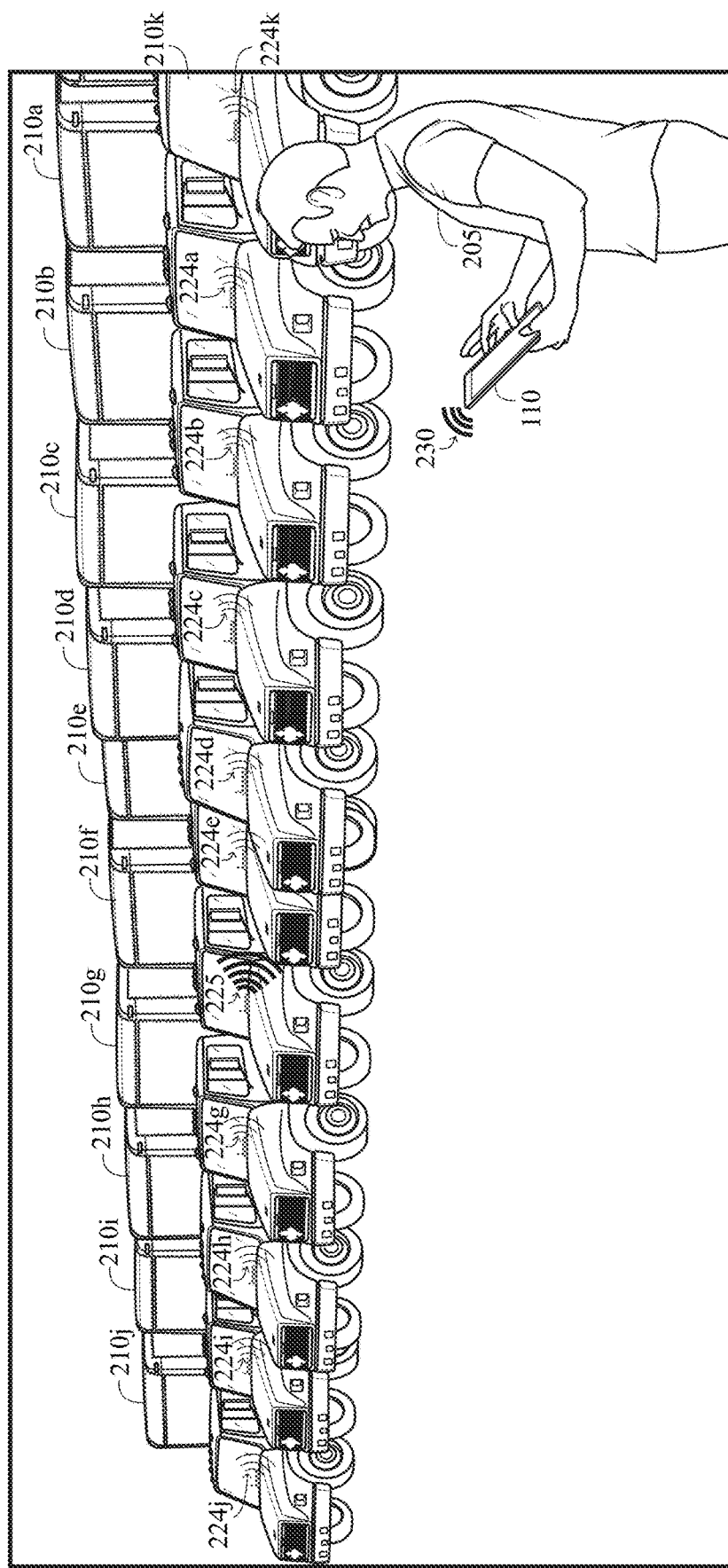
FIG. 13 is an illustration of a driver identifying a vehicle through connection of a tablet computer to an unpublished network.

As shown in FIG. 13, a staging yard for trucks 210a-210k, each of a multitude of trucks 210a-210k broadcast a wireless signal 224a-k for a truck specific network, with one truck 210f broadcasting a wireless signal 225. However, all of the wireless signal 224a-224k and 225 do not publish their respective SSID so that a mobile device 1107 must already be paired with the CVD 130 of the truck 210 in order to connect to the truck based wireless network 224a-224k or 225 of each of the CVDs 130 of each of the trucks 210a-210k. A driver 205 in possession of a tablet computer 1107 pairs with the specific truck wireless network 225 of the CVD 130 of the truck 210f, and thus the driver locates the specific truck 210f he is assigned to in a parking lot full of identical looking trucks 210a-210k.

One embodiment is a system for utilizing a remote profile manager for vehicle dynamic compliance with multiple vehicle statutes and regulations. The system comprises a truck 210, a CVD 130, a tablet computer 1107, a server 140 and a plurality of databases. The vehicle comprises an on-board computer with a memory having a vehicle identification number (VIN), a connector plug, and a motorized engine. The CVD 130 comprises a processor, a WiFi radio, a BLUETOOTH radio, a memory, and a connector for mating with the connector plug of the vehicle. The tablet computer 110 comprises a graphical user interface, a processor, a WiFi radio, a BLUETOOTH radio, and a cellular network interface. A location of the truck 210 is determined using a GPS component of the truck 210. The location of the truck 210 is transmitted to the server 140 by the CVD. The server 140 retrieves real-time compliance rules for the location of the truck from the plurality of databases, which are preferably State vehicle databases, municipal vehicle databases, county vehicle databases, and Federal vehicle databases. The server 140 transmits the real-time compliance rules to CVD 130 for display on the tablet computer 110 so that a driver of the truck 210 can stay in real-time compliance with State and Federal motor vehicle and driving rules. The rules pertain to speed limits, transport of toxic waste, the transport of refrigerated cargo, the rest durations for drivers, the necessary insurance coverage, the type of taxes and fees to be paid, and the like. The display on the tablet computer is preferably in the form of a visual alert, an audio alert or a haptic alert. Other displays include forms such as attestation forms, and data such as timers, current speed limits, and the like. The trigger for each jurisdiction is preferably from the GPS of the truck 210, the speed of the truck 210, cellular or WiFi triangulation from a network, and the like.

The CVD 130 obtains the vehicle identification number (VIN) from the on-board computer and transmits the VIN with the location to the server 140 for verification of the truck 210.

Another embodiment is a system for utilizing a remote profile manager for utilizing multiple vehicle odometer values. The system comprises a vehicle 210, a CVD 130, a tablet computer 110, a server 140 and a plurality of databases. The vehicle comprises an on-board computer with a memory having a vehicle identification number (VIN), a connector plug, a motorized engine, an odometer component from an engine source, an odometer component from a dashboard source, an odometer component from a chassis source, and an odometer component from a transmission source. Thus, the truck 210 has a multiple of odometers that can be used to determine a mileage of the truck 210. The connected vehicle device (CVD) 130 comprises a processor, a WiFi radio, a BLUETOOTH radio, a memory, and a connector for mating with the connector plug of the vehicle. The tablet computer 1107 comprises a graphical user interface, a processor, a WiFi radio, a BLUETOOTH radio, and a cellular network interface. Each of the odometer component from an engine source, the odometer component from a dashboard source, the odometer component from a chassis source, and the odometer component from a transmission source generates an odometer value. The CVD 130 generates a delta value for odometer value relative to a control odometer value. The CVD 130 monitors the odometer value from each of the odometer component from an engine source, the odometer component from a dashboard source, the odometer component from a chassis source, and the odometer component from a transmission source. The CVD 130 generates a new odometer value for one of the odometer component from an engine source, the odometer component from a dashboard source, the odometer component from a chassis source, and the odometer component from a transmission source, and the CVD modifies the odometer value by the delta value to generate the new odometer value.

In another embodiment, a method for controlling a function of a mobile device over a secure wireless network includes accessing, from at least one off vehicle source, off-vehicle content at a mobile device for a vehicle. The method also includes accessing, from a connected vehicle device (CVD), on-vehicle data for a vehicle at the mobile device for a vehicle. The method also includes combining the off-vehicle content with the on-vehicle data in order to enable, disable or manage at least one function of the mobile device over a secure wireless network.

Figure 15:
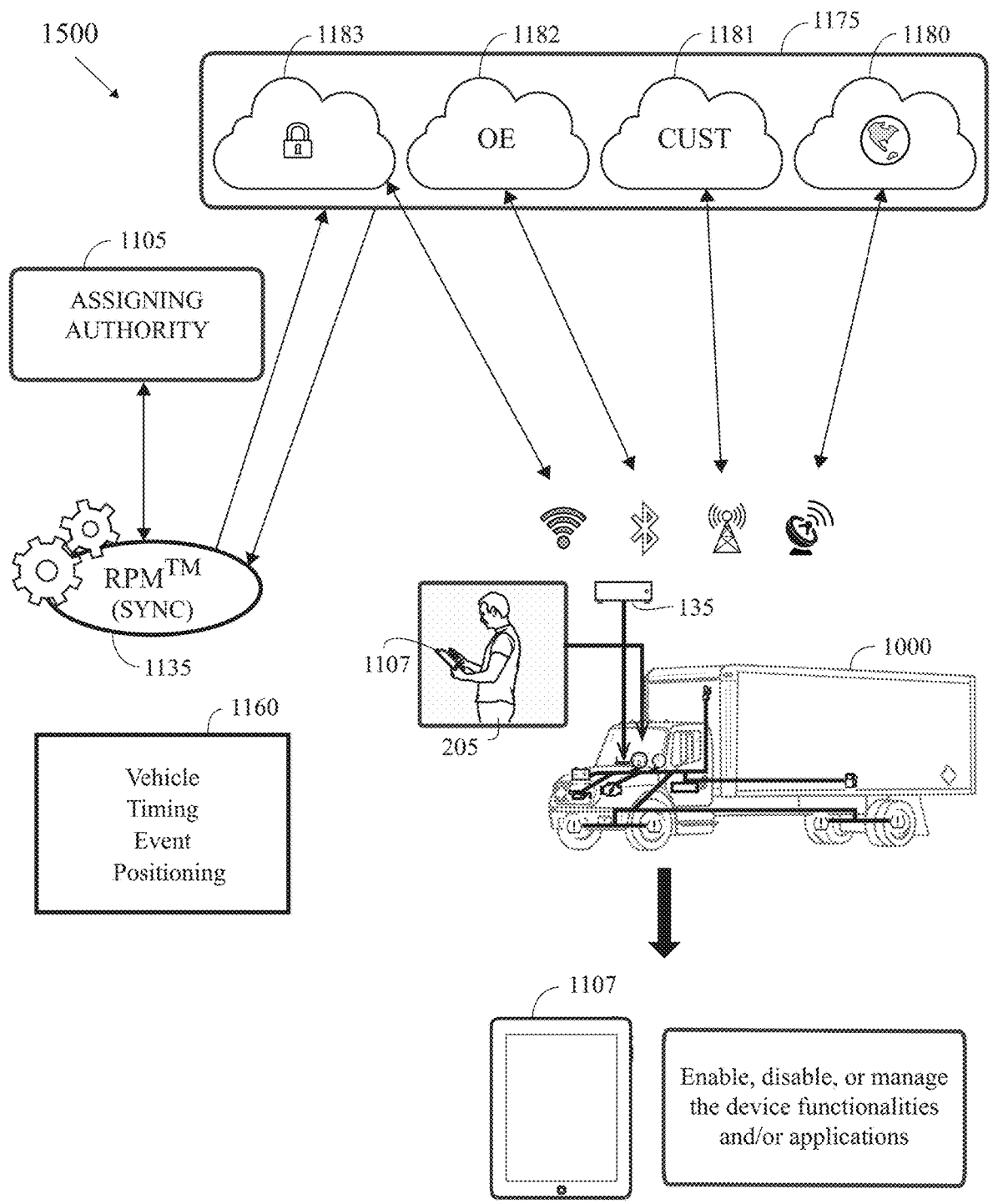
FIG. 15 is a block diagram of a system for remote profile management for utilizing data and computational information from on-vehicle and off-vehicle sources.

FIG. 15 is a block diagram of a system 1500 for remote profile management for utilizing data and computational information from on-vehicle and off-vehicle sources. As shown in FIG. 15, the system 1500 comprises an assigning authority engine 1105, a remote profile manager toolset 1135, databases (FIG. 2), cloud sources, a vehicle 1000 and a CVD 135 within the vehicle 1000. Each of the sensors (oil level sensor 1005, engine sensor 1010, a power sensor 1015, a refrigeration/HVAC sensor 1020, a temperature sensor 1025, tire pressure sensors 1030*a-d*, and fuel sensor 1035) is preferably connected to the data bus for transferring data to an on-board computer of the vehicle 1000, or directly to the CVD 135. Alternatively, some or all of the sensors use wireless communications to communication with the CVD 135. This on-vehicle data is accessed from the CVD 135 by the mobile device 1107 for the vehicle 1000, and combined with the off-vehicle content in order to enable, disable or manage at least one function of the mobile device over a secure wireless network. The cloud sources 1175 include main protected server/cloud 1183, an original equipment manufacturer server/cloud 1182, a customer server/cloud 1181 and a public server/cloud 1180. Multiple other servers/clouds and/or databases can be utilized with the present invention without departing from the scope and spirit of the claims such as a hybrid cloud source, a private cloud source, or a multi-cloud source. The cloud sources, databases, RPM 1135 and assigning authority engine 1105 communicate with the CVD 135 utilizing various wireless communication protocols including WiFi, cellular networks, BLUETOOTH, GPS, and the like. The contents of each of the databases (2001-2008) and cloud sources are accessible and combinable by the assigning authority engine 1105 to produce dynamic, temporal combinations of data elements and instructions for the vehicle 1000. The assigning authority engine 1105 is configured to use the remote profile manager toolset 1135 to execute the dynamic, temporal combinations. The dynamic, temporal combinations access data from the cloud sources comprising third party data and vehicle, timing, event, and/or positioning ("VTEP") data 1160 to inform instruction sets delivered by the assigning authority engine 1105. The instruction sets are preferably temporal permission for the on-vehicle sources and off-vehicle sources (e.g., applications) to connect and share data with each other. One or more elements of the VTEP data 1160 is used as the basis to synchronize timing between the data, or computational outputs of two or more sources of electronic information. A single coherent information picture 1170 is formed from fusing data and computational information from the on-vehicle and the off-vehicle sources. The new information data set combination (single coherent information picture) is a display of information generated from the combination of data from the on-vehicle sources and the off-vehicle sources. The data set can include dynamic route information (road condition changes due to weather, construction and the like), an updated driver's profile, vehicle engine date, cargo data, dynamic compliance rules, micro-navigation data, fuel stop data, inspection stations on the route, wireless communications connectivity status, time to destination, and the like. An example of a new information data set combination is imparting GPS location data from a truck/CVD onto cargo (the potato chips example). The new information data set combination is preferably any new combination of the connected data sources data for the specific vehicle of interest.

An operating system controls the execution of other computer programs, running of the PSO platform, and provides scheduling, input-output control, file and data management, memory management, and communication control and related services. The operating system may be, for example Windows (available from Microsoft, Corp. of Redmond, Wash.), LINUX or other UNIX variants (available from Red Hat of Raleigh, N.C. and various other vendors), Android and variants thereof (available from Google, Inc. of Mountain View, Calif.), Apple OS X, iOs and variants thereof (available from Apple, Inc. of Cupertino, Calif.), or the like.

The system and method described in connection with the embodiments disclosed herein is preferably embodied directly in hardware, in a software module executed by a processor, or in a combination of the two. A software module preferably resides in flash memory, ROM memory, EPROM memory, EEPROM memory, RAM memory, registers, a hard disk, a removable disk, a CD-ROM, or any other form of storage medium known in the art. An exemplary storage medium is preferably coupled to the processor, so that the processor reads information from, and writes information to, the storage medium. In the alternative, the storage medium is integral to the processor. In additional embodiments, the processor and the storage medium reside in an Application Specific Integrated Circuit (ASIC). In additional embodiments, the processor and the storage medium reside as discrete components in a computing device. In additional embodiments, the events and/or actions of a method reside as one or any combination or set of codes and/or instructions on a machine-readable medium and/or computer-readable medium, which are incorporated into a computer software program.

In additional embodiments, the functions described are implemented in hardware, software, firmware, or any combination thereof. If implemented in software, the functions are stored or transmitted as one or more instructions or code on a computer-readable medium. Computer-readable media includes both computer storage media and communication media including any medium that facilitates transfer of a computer program from one place to another. A storage medium is any available media that is accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection is termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and BLU-RAY disc where disks usually reproduce data magnetically, while discs usually reproduce data optically with lasers. Combinations of the above should also be included within the scope of computer-readable medium.

A computer program code for carrying out operations of the Present Invention is preferably written in an object oriented, scripted or unscripted programming language such as C++, C#, SQL, Java, Python, Javascript, Typescript, PHP, Ruby, or the like.

Each of the interface descriptions preferably discloses use of at least one communication protocol to establish handshaking or bi-directional communications. These protocols preferably include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MIMS, GPRS and Flash. The databases used with the system preferably include but are not limited to MSSQL, Access, MySQL, Oracle, DB2, Open Source DBs and others. Operating system used with the system preferably include Microsoft 2010, XP, Vista, 200o Server, 2003 Server, 2008 Server, Windows Mobile, Linux, Android, Unix, I series, AS 400 and Apple OS.

The underlying protocol at a server, is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP"), Secure Hypertext Transfer Protocol ("HTTPS"), or other similar protocols. The protocol at the server is preferably HTTPS.

Components of a server includes a CPU component, a graphics component, memory, non-removable storage, removable storage, Network Interface, including one or more connections to a fixed network, and SQL database(s). Included in the memory, is an operating system, a SQL server or other database engine, and computer programs/software.

Kennedy et al., U.S. patent application Ser. No. 16/912,265, filed on Jun. 25, 2020 for a Method And System For Generating Fueling Instructions For A Vehicle, is hereby incorporated by reference in its entirety.

Kennedy et al., U.S. patent Ser. No. 10/652,935 for Secure Wireless Networks For Vehicles, is hereby incorporated by reference in its entirety.

Kennedy et al., U.S. patent application Ser. No. 16/870,955, filed on May 9, 2020 for Secure Wireless Networks For Vehicle Assigning Authority, is hereby incorporated by reference in its entirety.

Kennedy et al., U.S. patent application Ser. No. 16/450,959, filed on Jun. 24, 2019 for Secure Wireless Networks For Vehicles, is hereby incorporated by reference in its entirety.

Son et al., U.S. patent Ser. No. 10/475,258 for a Method And System For Utilizing Vehicle Odometer Values And Dynamic Compliance, is hereby incorporated by reference in its entirety.

Son et al., U.S. patent Ser. No. 10/070,471 for a Secure Wireless Networks For Vehicles, is hereby incorporated by reference in its entirety.

Son et al., U.S. patent Ser. No. 10/652,935 for a Secure Wireless Networks For Vehicles, is hereby incorporated by reference in its entirety.

Kennedy et al., U.S. patent application Ser. No. 16/927,231, filed on Jul. 13, 2020 for a Remote Profile Manager For A Vehicle, is hereby incorporated by reference in its entirety.

Kennedy et al., U.S. patent application Ser. No. 16/912,265, filed on Jun. 25, 2020 for a Method And System For Generating Fueling Instructions For A Vehicle, is hereby incorporated by reference in its entirety.

Kopchinsky et al., U.S. patent application Ser. No. 17/022,027, filed on Sep. 15, 2020 for a Micro-Navigation For A Vehicle, is hereby incorporated by reference in its entirety.

Kennedy et al., U.S. patent application Ser. No. 17/384,768, filed on Jul. 25, 2021, for a Method And System For Dynamic Wireless Connection Management, is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention the following:

1. A system for controlling a function of a mobile device over a secure wireless network, the system comprising:
   a mobile device for a vehicle;
   a connected vehicle device (CVD) comprising on-vehicle data for a vehicle; and
   at least one off vehicle source selected from a group comprising at least one database, at least one cloud source, or at least one physical structure with a communication device;
   wherein the system is configured to access and combine off-vehicle content with on-vehicle data in order to enable, disable or manage at least one function of the mobile device over a secure wireless network.

2. The system according to claim 1 wherein the mobile device comprises a remote profile manager (RPM) toolset, wherein the RPM is configured to execute the plurality of dynamic, temporal combinations to access vehicle, timing, event, and/or positioning ("VTEP") data to inform the plurality of instruction sets communicated by the assigning authority engine, and wherein the RPM is configured to use one or more elements of the VTEP data to synchronize on-vehicle data elements or a computational output of the off-vehicle content, to generate a new information data set combination.

3. The system according to claim 1 further comprising an assigning authority, wherein the assigning authority instructs the mobile device for permitted actions by an operator of the vehicle and/or time frames for the permitted actions.

4. The system according to claim 3 wherein the assigning authority is configured to adapt to a present environment based on data from the RPM.

5. The system according to claim 2 wherein the RPM is configured to provide edge self-healing to the mobile device.

6. The system according to claim 1 wherein the at least one off-vehicle source is at least one cloud source selected from the group comprising a public cloud source, a private cloud source, a hybrid cloud source, or a multi-cloud source.

7. The system according to claim 1 wherein the at least one off-vehicle source is at least one physical infrastructure with the communication device selected from the group comprising a building, a gate, an access controlled point of entry, a parking structure, a weigh station, a toll collection structure, a fueling equipment and a vehicle service equipment.

8. The system according to claim 1 wherein the at least one off-vehicle source is at least one database and a mobile application operating on a mobile device, and the data originates from the mobile application.

9. The system according to claim 3 wherein the assigning authority is configured to authorize the at least one cloud source to directly receive data from or provide data to the CVD, an authorized cloud provider, or an authorized user granted access by the assigning authority.

10. The system according to claim 3 wherein the assigning authority is configured to enable, disable or manage the at least one function of the mobile device over a secure wireless network based on VTEP data.

11. The system according to claim 10 wherein the VTEP data includes at least one of gear position, speed, fuel level, rotations per minute, location, drive status, seatbelt use, windshield wiper function.

12. The system according to claim 1 wherein enabling, disabling, and managing functions comprises at least one application, at least one feature, or at least one widget.

13. The system according to claim 12 wherein enabling, disabling, or managing functionality is based on an operator profile.

14. The system according to claim 1 wherein enabling, disabling, and managing functions comprises enabling, disabling, and managing functions of a user interface page in an mobile application on the mobile device.

15. The system according to claim 12 wherein enabling, disabling, or managing functionality is based on an operator positioned away from the vehicle.

16. A method for controlling a function of a mobile device over a secure wireless network, the method comprising:
   accessing, from at least one off vehicle source, off-vehicle content at a mobile device for a vehicle;
   accessing, from a connected vehicle device (CVD), on-vehicle data for a vehicle at the mobile device for a vehicle; and
   combining the off-vehicle content with the on-vehicle data in order to enable, disable or manage at least one function of the mobile device over a secure wireless network;
   wherein the at least one off vehicle source selected from a group comprising at least one database, at least one cloud source, or at least one physical structure with a communication device.

17. The method according to claim 16 wherein the mobile device comprises a remote profile manager (RPM) toolset, wherein the RPM is configured to execute the plurality of dynamic, temporal combinations to access vehicle, timing, event, and/or positioning ("VTEP") data to inform the plurality of instruction sets communicated by the assigning authority engine, and wherein the RPM is configured to use one or more elements of the VTEP data to synchronize on-vehicle data elements or a computational output of the off-vehicle content, to generate a new information data set combination.

18. The method according to claim 16 further comprising transmitting instructions, from an assigning authority to the mobile device, for permitted actions by an operator of the vehicle and/or time frames for the permitted actions.

19. The method according to claim 17 further comprising adapting at an assigning authority to a present environment based on data from the RPM.

20. The method according to claim 17 further comprising providing, at the RPM, edge self-healing to the mobile device.

21. A system for controlling a function of a mobile device over a secure wireless network, the system comprising:
   a mobile device for a vehicle, the mobile device comprising a mobile application;
   a connected vehicle device (CVD) comprising on-vehicle data for a vehicle; and
   at least one off vehicle source selected from a group comprising at least one database, at least one cloud source, or at least one physical structure with a communication device;
   wherein the mobile application is configured to access and combine off-vehicle content with on-vehicle data in order to enable, disable or manage at least one function of the mobile device.

\* \* \* \* \*